US009485503B2

(12) United States Patent
Zhang et al.

(10) Patent No.: US 9,485,503 B2
(45) Date of Patent: Nov. 1, 2016

(54) INSIDE VIEW MOTION PREDICTION AMONG TEXTURE AND DEPTH VIEW COMPONENTS

(71) Applicant: Qualcomm Incorporated, San Diego, CA (US)

(72) Inventors: Li Zhang, San Diego, CA (US); Ying Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 389 days.

(21) Appl. No.: 13/678,374

(22) Filed: Nov. 15, 2012

(65) Prior Publication Data

US 2013/0128965 A1 May 23, 2013

Related U.S. Application Data

(60) Provisional application No. 61/561,800, filed on Nov. 18, 2011, provisional application No. 61/563,771, filed on Nov. 26, 2011, provisional application No. 61/585,169, filed on Jan. 10, 2012.

(51) Int. Cl.

| | |
|---|---|
| ***H04N 7/14*** | (2006.01) |
| ***H04N 19/50*** | (2014.01) |
| ***H04N 19/00*** | (2014.01) |
| ***H04N 19/597*** | (2014.01) |
| ***H04N 19/105*** | (2014.01) |
| ***H04N 19/119*** | (2014.01) |

(Continued)

(52) U.S. Cl.

CPC ........ *H04N 19/00569* (2013.01); *H04N 19/00* (2013.01); *H04N 19/103* (2014.11); *H04N 19/105* (2014.11); *H04N 19/11* (2014.11); *H04N 19/119* (2014.11); *H04N 19/157* (2014.11); *H04N 19/167* (2014.11); *H04N 19/50* (2014.11); *H04N 19/51* (2014.11); *H04N 19/53* (2014.11); *H04N 19/597* (2014.11)

(58) Field of Classification Search

None

See application file for complete search history.

(56) References Cited

U.S. PATENT DOCUMENTS

| | | | |
|---|---|---|---|
| 5,107,705 | A | 4/1992 | Wraight et al. |
| 5,329,369 | A | 7/1994 | Willis et al. |

(Continued)

FOREIGN PATENT DOCUMENTS

| | | | |
|---|---|---|---|
| CN | 1301370 | A | 6/2001 |
| CN | 101176348 | A | 5/2008 |

(Continued)

OTHER PUBLICATIONS

MPEG-4 AVC/H.264 Motion Vector Prediction Rev. 4, Shevach Riabtsev, available at http://www.academia.edu/6574861/MPEG-4_AVC_H.264_Motion_Vector_Prediction.*

(Continued)

*Primary Examiner* — Richard Torrente
*Assistant Examiner* — Shadan E Haghani
(74) *Attorney, Agent, or Firm* — Shumaker & Sieffert, P.A.

(57) ABSTRACT

The techniques of this disclosure may be generally related to using motion information for a corresponding block from a texture view component that corresponds with a block in a depth view component in coding the block in the depth view component. In some examples, for coding purposes, the techniques may use motion information when the spatial resolution of the texture view component is different than the spatial resolution of the depth view component.

31 Claims, 10 Drawing Sheets

(51) Int. Cl.

| | |
|---|---|
| *H04N 19/51* | (2014.01) |
| *H04N 19/11* | (2014.01) |
| *H04N 19/103* | (2014.01) |
| *H04N 19/157* | (2014.01) |
| *H04N 19/167* | (2014.01) |
| *H04N 19/53* | (2014.01) |

(56) References Cited

U.S. PATENT DOCUMENTS 5,821,986 A 10/1998 Yuan et al.
5,852,565 A 12/1998 Demos
6,104,434 A 8/2000 Nakagawa et al.
6,125,147 A 9/2000 Florencio et al.
6,310,919 B1 10/2001 Florencio
6,452,969 B1 9/2002 Yim
6,665,344 B1 12/2003 Fimoff
7,006,700 B2 2/2006 Gilgen et al.
7,163,335 B2 1/2007 Dishaw et al.
8,160,149 B2 4/2012 Demos
8,184,028 B2 5/2012 Tsai et al.
8,239,766 B2 8/2012 Tian et al.
8,750,623 B2 6/2014 Ruan et al.
8,811,482 B2 8/2014 Amon et al.
9,106,923 B2 8/2015 Lee et al.
9,143,796 B2 9/2015 Bang et al.
2002/0120401 A1 8/2002 MacDonald et al.
2003/0202592 A1 10/2003 Sohn et al.
2005/0041736 A1 2/2005 Butler-Smith et al.
2005/0195899 A1 9/2005 Han
2005/0195900 A1 9/2005 Han
2006/0012719 A1* 1/2006 Karczewicz ......... H04N 19/187 348/699
2006/0120614 A1 6/2006 Flierl et al.
2006/0133492 A1* 6/2006 Boyce ...................... 375/240.16
2006/0133503 A1* 6/2006 Park et al. ............... 375/240.16
2006/0193524 A1 8/2006 Tarumoto et al.
2006/0233258 A1 10/2006 Holcomb
2006/0268005 A1 11/2006 Hutchins et al.
2007/0177672 A1 8/2007 Yang et al.
2008/0152241 A1 6/2008 Itoi et al.
2008/0179094 A1 7/2008 Repin et al.
2008/0219350 A1 9/2008 Guo et al.
2008/0232470 A1 9/2008 Park et al.
2009/0002845 A1 1/2009 Hosoya et al.
2009/0028245 A1* 1/2009 Vieron et al. ............ 375/240.16
2009/0060034 A1 3/2009 Park et al.
2009/0147848 A1* 6/2009 Park et al. ............... 375/240.13
2009/0152005 A1 6/2009 Chapman et al.
2009/0175334 A1 7/2009 Ye et al.
2009/0187391 A1 7/2009 Wendt et al.
2009/0220000 A1* 9/2009 Park et al. ............... 375/240.13
2009/0262804 A1 10/2009 Pandit et al.
2009/0262840 A1 10/2009 Jan et al.
2010/0020871 A1 1/2010 Hannuksela et al.
2010/0027619 A1 2/2010 Doser et al.
2010/0046635 A1 2/2010 Pandit et al.
2010/0046906 A1 2/2010 Kanamori et al.
2010/0098157 A1 4/2010 Yang
2010/0111183 A1 5/2010 Jeon et al.
2010/0118933 A1 5/2010 Pandit et al.
2010/0147510 A1 6/2010 Kwok et al.
2010/0155142 A1 6/2010 Thambynayagam et al.
2010/0158129 A1 6/2010 Lai et al.
2010/0165077 A1 7/2010 Yin et al.
2010/0166070 A1 7/2010 Goel
2010/0177819 A1 7/2010 Jeon et al.
2010/0246683 A1* 9/2010 Webb et al. ............ 375/240.16
2010/0250139 A1 9/2010 Hobbs et al.
2010/0254458 A1 10/2010 Amon et al.
2010/0260268 A1 10/2010 Cowan et al.
2010/0284466 A1 11/2010 Pandit et al.
2011/0026608 A1 2/2011 Luthra
2011/0038422 A1 2/2011 Cheon et al.
2011/0058017 A1 3/2011 Lee et al.
2011/0090959 A1 4/2011 Wiegand et al.
2011/0115880 A1 5/2011 Yoo et al.
2011/0170012 A1 7/2011 Cheon et al.
2011/0216833 A1* 9/2011 Chen et al. .............. 375/240.16
2011/0221861 A1 9/2011 Jeon et al.
2011/0222602 A1* 9/2011 Sung et al. .............. 375/240.12
2011/0255796 A1 10/2011 Nakamura et al.
2011/0261883 A1 10/2011 Bang et al.
2011/0310982 A1 12/2011 Yang et al.
2012/0056981 A1 3/2012 Tian et al.
2012/0075436 A1 3/2012 Chen et al.
2012/0084652 A1 4/2012 Martinez Bauza et al.
2012/0229602 A1 9/2012 Chen et al.
2012/0274664 A1 11/2012 Fagnou
2013/0022113 A1 1/2013 Chen et al.
2013/0022127 A1* 1/2013 Park et al. .............. 375/240.16
2013/0038686 A1 2/2013 Chen et al.
2013/0057646 A1 3/2013 Chen et al.
2013/0127987 A1 5/2013 Zhang et al.
2013/0182760 A1 7/2013 Sasai et al.
2013/0265409 A1 10/2013 Tjhang et al.
2013/0287093 A1 10/2013 Hannuksela et al.
2013/0311147 A1 11/2013 Greenwood
2013/0315571 A1* 11/2013 Park et al. .................... 386/329
2014/0085416 A1 3/2014 Chang et al.
2014/0218473 A1 8/2014 Hannuksela et al.
2014/0341292 A1 11/2014 Schwarz et al.

FOREIGN PATENT DOCUMENTS

CN 101690220 A 3/2010
CN 101822046 A 9/2010
CN 101911700 A 12/2010
EP 1321893 A2 6/2003
EP 2810443 A1 12/2014
JP 2010507275 A 3/2010
JP 2010507961 A 3/2010
JP 2010524338 A 7/2010
JP 2010525724 A 7/2010
JP 2011509631 A 3/2011
JP 2013030898 A 2/2013
JP 2014517563 A 7/2014
KR 100919885 B1 9/2009
KR 20100014553 A 2/2010
KR 20100066304 A 6/2010
KR 20100105877 A 9/2010
KR 20110027231 A 3/2011
KR 20110093792 A 8/2011
TW 1332794 B 11/2010
TW 1332799 B 11/2010
TW 1333201 B 11/2010
TW 1335183 B 12/2010
WO 2008048499 A2 4/2008
WO 2008051041 A1 5/2008
WO 2008123917 A2 10/2008
WO 2008133455 A1 11/2008
WO 2009091383 A2 7/2009
WO 2010043773 A1 4/2010
WO 2010073513 A1 7/2010
WO 2010088420 A1 8/2010
WO 2010096189 A1 8/2010
WO 2010123862 A1 10/2010
WO 2010126227 A2 11/2010
WO 2010126613 A2 11/2010
WO 2011046607 A2 4/2011
WO 2011094034 A2 8/2011
WO 2011100735 A1 8/2011
WO 2011128269 A1 10/2011
WO 2012006299 A1 1/2012
WO 2012039936 3/2012
WO 2012039939 A2 3/2012
WO 2012122364 9/2012
WO 2012171477 A1 12/2012
WO 2013113997 A1 8/2013

OTHER PUBLICATIONS

"H.264-Based Depth Map Sequence Coding Using Motion INformation of Corresponding Texture Video" by Han Oh, 2006.*

(56) References Cited

OTHER PUBLICATIONS

ITU-T H.264, Series H: Audiovisual and Multimedia Systems, Infrastructure of audiovisual services—Coding of moving video, Advanced video coding for generic audiovisual services, The International Telecommunication Union, Mar. 2009, 670 pp.
"Applications and Requirements on 3D Video Coding," ISO/IEC JTC1/SC29/WG11, MPEG2011/N12035, Geneva, Switzerland, Mar. 2011, 7 pp.
"Test Model under Consideration for AVC based 3D video coding," MPEG Meeting; Nov. 28, 2011-Dec. 2, 2011; Geneva; (Motion Picture Expert Group or ISO/IEC JTC1/SC29/WG11), No. N12349, edited by Miska M. Hannuksela,15 pp.
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JVTVC-D503, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011,193 pp.
Bross et al., "WD4: Working Draft 4 of High-Efficiency Video Coding," 6th Meeting: JCTVC-F803_d2, Torino, IT, Jul. 14-22, 2011, 2011, 226 pp.
Bross et al., "WD5: Working Draft 5 of High-Efficiency Video Coding," 7th Meeting: Geneva, Switzerland, Nov. 2011, JCTVC-G1103_d2, 214 pp.
Bross et al., "High efficiency video coding (HEVC) text specification draft 6," 7th Meeting: Geneva, CH, Nov. 21-30, 2011, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
"Call for Proposals on 3D Video Coding Technology," ISO/IEC JTC1/SC29/WG11, MPEG2011/N12036, Geneva, Switzerland, Mar. 2011, 20 pp.
"Changes to VSRS Software Manual," found at ftp://ftp.merl.com/pub/avetro/3dv-cfp/software/, dated Feb. 19, 2008 through Aug. 27, 2009, 3 pp.
Chen et al., "Description of 3D video technique proposal by Qualcomm Incorporated," M22583, MPEG of ISO/IEC/JTC1/SC291WG11, Geneva, Switzerland, Nov. 2011, 21 pp.
De Silva et al., "Display Dependent Preprocessing of Depth Maps Based on Just Noticeable Depth Difference Modeling," IEEE Journal of Selected Topics in Signal Processing, vol. 5, No. 2, Apr. 2011, pp. 335-351.
Grewatsch et al., "Sharing of Motion Vectors in 3D Video Coding," 2004 International Conference on Image Processing (ICIP), University of Rostock Institute of Communications Engineering, Germany, Oct. 24-27, 2004, pp. 3271-3274.
Hannuksela et al., "3D-AVC Draft Text 3," Document JCT3V-A1002, 1st Meeting: Stockholm, SE, Jul. 16-20, 2012, 68 pp.
Hannuksela, "3DV-ATM Slice Header Prediction," MPEG Meeting, ISO/IEC/JTC1/SC29/WG11/M23697, Feb. 2012, 11 pp.
International Search Report and Written Opinion—PCT/US2012/065675—ISA/EPO—Feb. 28, 2013, 16 pp.
ISO/IEC JTC 1/SC 29, ISO/IEC 14496-5:2001/FDAM 15:2009(E), ISO/IEC JTC 1/SC 29/WG 11, Information technology—Coding of audio-visual objects—Part 5: Reference software, Amendment 15: Reference software for Multiview Video Coding, Dec. 14, 2009, 5 pp.
ITU-T H.264, Series H: Audiovisual and Multimedia Systems, Infrastructure of audiovisual services—Coding of moving video, Advanced video coding for generic audiovisual services, Mar. 2010, 674 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Lee et al., "Description of AVC compatible 3D video coding technology by Samsung," MPEG Meeting; Nov. 28, 2011-Dec. 2, 2011; Geneva; (Motion Picture Expert Group or ISO/IEC JTC1/SC29/WG11), No. M22632, Nov. 27, 2011, 24 pp.
Merkle et al., "Multi-View Video Plus Depth Representation and Coding," IEEE International Conference on Image Processing, Sep. 16 2007-Oct. 19 2007, pp. 201-204, vol. 1.
Oh et al., "H.264-Based Depth Map Sequence Coding Using Motion Information of Corresponding Texture Video", Gwangju Institute of Science and Technology (GIST), Korea, 2006, pp. 898-907 (In accordance with MPEP § 609.04 (a), Applicant points that the 2006 year of publication is sufficiently earlier than the effective U.S. filing date and any foreign priority date so that the particular month of publication is not in issue.).
"Report on Experimental Framework for 3D Video Coding," ISO/IEC JTC1/SC29/WG11, MPEG2010/N11631, Guangzhou, China, Oct. 2010, 10 pp.
Sullivan et al., "Editors' draft revision to ITU-T Rec. H.264 ISO/IEC 14496-10 Advanced Video Coding—in preparation for ITU-T SG 16 AAP Consent (in integrated form)," 30th Meeting: Geneva, CH, Jan. 29-Feb. 3, 2009, Document JVT-AA007, 683 pp.
Suzuki et al., "WD on MVC extensions for inclusion of depth maps", ISO/IEC/JTC1/SC29/WG11/N12351, Dec. 2011, 24 pp.
Tian et al., "On 2D + Depth SEI Message," MPEG Meeting; ISO/IEC/JTC1/SC29/WG11, M16320, Apr. 20, 2009-Apr. 24, 2009; Maui; HI, 10 pp.
Tian et al., "On spatially interleaved pictures SEI Message," 30th Meeting: Geneva, CH, JVT-AD017_r1, Jan. 29, 2009-Feb. 3, 2009, 12 pp.
U.S. Appl. No. 13/553,315, by Ying Chen, filed Jul. 19, 2012.
U.S. Appl. No. 13/553,617, by Ying Chen, filed Jul. 19, 2012.
U.S. Appl. No. 13/553,628, by Ying Chen, filed Jul. 19, 2012.
"VSRS Software Manual," Version VSRS 3.0, found at ftp://ftp.merl.com/pub/avetro/3dv-cfp/software/, May 28, 2009, 19 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "High efficiency video coding (HEVC) text specification draft 10 (for FDIS & Last Call)," 10th Meeting: Geneva, CH, Jan. 14-23, 2013, JCTVC-L1003_v34, 310 pp.
Zhang et al., "Joint Multiview Video Plus Depth Coding," IEEE 17th International Conference on Image Processing, Hong Kong, Sep. 26-29, 2010, pp. 2865-2868.
Reply to Written Opinion dated Feb. 28, 2013, from international application No. PCT/US2012/065675, faxed Jun. 5, 2013, 31 pp.
International Preliminary Report on Patentability—PCT/US2012/065675—The International Bureau of WIPO Geneva Switzerland Dec. 2, 2013, 7 pp.
ITU-T H.265, Series H: Audiovisual and Multimedia Systems, Infrastructure of audiovisual services—Coding of moving video, High efficiency video coding, The International Telecommunication Union, Apr. 2013, 317 pages.
Tsai et al., CE4 Subset3: Slice Common Information Sharing, 20110307, No. JCTVC-E045, Mar. 7, 2011, XP030008551, 7 pp.
Hannuksela, "3DV-ATM Slice Header Prediction," MPEG Meeting; San Jose, CA; (Motion Picture Expert Group or ISO/IEC JTC1/SC29/WG11), No. M23697, Feb. 1, 2012, XP030052222, 11 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
Misra, et al., "Entropy Slices for Parallel Entropy Coding", Joint Collaborative Team on Video Coding (JCT-VC) of ITU-T SG16 WP3 and ISO/IEC JTC1/SC29/WG11, 3rd Meeting: Guangzhou, CN, Oct. 2010, JCTVC-C256, 6 pp.
Ouedraogo, et al.,"Results on Slice Header Modifications", Joint Collaborative Team on Video Coding (JCT-VC) of ITU-T SG16 WP3 and ISO/IEC JTC1/SC29/WG11, 6th Meeting: Torino, IT, Jul. 2011, JCTVC-F503, 9 pp.

(56) References Cited

OTHER PUBLICATIONS

3GPP TS 26.244 V9.1.0, 3rd Generation Partnership Project; Technical Specification Group Services and System Aspects; Transparent end-to-end packet switched streaming service (PSS); 3GPP file format (3GP), (Release 9), Mar. 2010, 55 pp.
Bross et al., "WD5: Working Draft 5 of High-Efficiency Video Coding," JCTVC-G1103_d6, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pp.
Chen, et al., "Low-Complexity Asymmetric Multiview Video Coding," 2008 IEEE International Conference on Multimedia and Expo, ICME 2008, Jun. 23-Apr. 26, 2008, pp. 773-776.
Chen, et al., "Picture-Level Adaptive Filter for Asymmetric Stereoscopic Video," 15th IEEE International Conference on Image Processing, ICIP 2008, Oct. 12-15, 2008, pp. 1944-1947.
Chen, et al., "Regionally Adaptive Filtering for Asymmetric Stereoscopic Video Coding," IEEE International Symposium on Circuits and Systems, 2009, ISCAS May 24-27, 2009. pp. 2585-2588.
Hannuksela et al., "3D-AVC Draft Text 8," Joint Collaborative Team on 3D Video Coding Extension Developmentof ITU-T SG 16 WP 3 and ISO/IEC JTC 1/SC 29/WG 11, Document: JCT3VF1002_v3, Oct. 25-Nov. 1, 2013, 62 pp.
Wenge et al., "Asymmetric Stereoscopic Video Encoding Algorithm Based on Joint Compensation Prediction", IEEE International Conference on Communications and Mobile Computing, Jan. 6, 2009, XP031434775, ISBN: 978-0-7695-3501-2, pp. 191-194.
ITU-T H.265, Series H: Audiovisual and Multimedia Systems, Infrastructure of audiovisual services—Coding of moving video, High efficiency video coding, The International Telecommunication Union, Apr. 2015, 634 pp.
Jiang, et al., "DIBR-Based 3D Videos Using Non Video Rate Range Image Stream," International Conference on Multimedia and Expo, IEEE, Jul. 9-12, 2006, pp. 1873-1876.
Vetro, et al., "Joint Draft 8.0 on Multiview Video Coding", 28th JVT meeting, Hannover, Germany, Document: JVT-AB204 (rev.1), Jul. 2008. available from http:// wftp3. itu.int/av-arch/jvt-site/2008_07_Hannover/JVT-AB204, 73 pp.
Sullivan, et al., "Editor's draft revision to ITU-T Rec. H.264, ISO/IEC 14496-10 Advanced Video Coding—in preparation for ITU-T SG 16 AAP Consent (in integrated form)," Document: JVT-AD00730th JVT meeting, Geneva, CH, Feb. 2009, available http://wftp3.itu.int/av-arch/jvt-site/2009_01_Geneva/JVT-AD007.zip, 689 pp.
Kamolrat, et al., "3D motion estimation for depth image coding in 3D video coding," IEEE Transactions on Consumer Electronics, IEEE, May 2009, vol. 55, No. 2, pp. 824-830.
Kauff, et al., "Depth Map Creation and Image-Based Rendering for Advanced 3DTV Services Providing Interoperability and Scalability", Signal Processing. Image Communication, Elsevier Science Publishers, Amsterdam, NL, Mar. 16, 2007, vol. 22, No. 2, XP005938670, pp. 217-234.
Schwarz, et al., "Overview of the Scalable Video Coding Extension of the H.264/AVC Standard", IEEE Transactions on Circuits and Systems for Video Technology, IEEE Service Center, Piscataway, NJ, US, vol. 17, No. 9, Sep. 2007, pXP011193019, pp. 1103-1120.
Seo et al., "Motion information sharing mode for depth video coding", 3DTV-conference: The True Vision-Capture, Transmission and Display of 3D Video (3DTV-CON), 2010, Jun. 7, 2010, EEE, XP031706528, ISBN: 978-1-4244-6377-0, 4 pp.
Vetro, et al., "Joint Multiview Video Model (JMVM) 2.0," Joint Video Team (JVT) of ISO/IEC MPEG & ITU-T VCEG (ISO/IEC JTC1/SC29/WG11 and ITU-T SG16 Q.6), 21st Meeting: Hangzhou, China, Oct. 20-27, 2006, JVT-U207, 11 pp.
Video and Requirements: "Applications and Requirements on 3D Video Coding", ISO/IEC JTC1/SC29/WG11MPEG2011/N12035, Mar. 2011, URL, ftp://ftp.merl.com/pub/avetro/3dv-cfp/docs/w12035.zip, 7 pp.
Wildeboer, et al., "Depth up—sampling for depth coding using view information", Proc. of 3DTV Conference, May 2011, 4 pp.
Sullivan et al., Document: JVT-AA007, "Editors' Draft Revision to ITU-T Rec. H.264|ISO/IEC 14496-10 Advanced video Coding—In Preparation for ITU-T SG 16 AAP Consent (in integrated form)," Joint Video Team (JVT) of ISO/IEC MPEG & ITU-T VCEG (ISO/IEC JTC1/SC29/WG11 and ITU-T SG16 Q.6), Feb. 2, 2009; 30th Meeting: Geneva, CH, Jan. 29-Feb. 3, 2009, http://wftp3.itu.int/av-arch/jvt-site/2009_01_Geneva/JVT-AD007.zip, 689 pp. uploaded in parts].
Vetro et al. "Joint Draft 8.0 on Multiview Video Coding", 28th JVT meeting, Hannover, Germany, Document: JVT-AB204 (rev.1), Jul. 20-25, 2008. Available from http:// wftp3. itu.int/av-arch/jvt-site/2008_07_Hannover/JVT-AB204, 73 pp.

* cited by examiner

INSIDE VIEW MOTION PREDICTION AMONG TEXTURE AND DEPTH VIEW COMPONENTS

This application claims the benefit of:

U.S. Provisional Patent Application No. 61/561,800, filed on Nov. 18, 2011;

U.S. Provisional Patent Application No. 61/563,771, filed on Nov. 26, 2011; and

U.S. Provisional Application No. 61/585,169, filed Jan. 10, 2012, the entire contents each of which is incorporated by reference in its entirety.

TECHNICAL FIELD

This disclosure relates to video coding and, more particularly, to techniques for coding video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called “smart phones,” video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques related to multiview video coding and 3D video coding. For instance, the techniques described in this disclosure may provide a mechanism by which a video coder (e.g., encoder or decoder) may determine motion information for a depth view block based on motion information for one or more corresponding texture view blocks. These techniques may be applicable to instances where the spatial resolution for the depth view component is different than that of the texture view component. For example, the techniques of this disclosure may describe determining motion information for depth view blocks in instances where a spatial resolution of a depth view component that includes the depth view block is different than that of a corresponding texture view component that includes the one or more corresponding texture view blocks.

In one example, the disclosure describes a method for coding video data. The method includes coding a plurality of texture view blocks of a texture view component. In this example, the plurality of texture view blocks corresponds to a single depth view block of a depth view component. The method also includes determining at least one of reference index information, partition information, and motion vector information of the single depth view block from a texture view block of the plurality of corresponding texture view blocks, and coding the single depth view block based on at least one of the determined reference index, partition information, and motion vector information. In this example, the depth view component and the texture view component belong to a same view within an access unit, the single depth view block indicates relative depth of all pixels within the corresponding plurality of texture view blocks, and a spatial resolution of the texture view component and a spatial resolution of the depth view component are different.

In one example, the disclosure describes a device for coding video data. The device comprises a video coder that is configured to code a plurality of texture view blocks of a texture view component. In this example, the plurality of texture view blocks corresponds to a single depth view block of a depth view component. The video coder is also configured to determine at least one of reference index information, partition information, and motion vector information of the single depth view block from a texture view block of the plurality of corresponding texture view block, and code the single depth view block based on at least one of the determined reference index, partition information, and motion vector information. In this example, the depth view component and the texture view component belong to a same view within an access unit, the single depth view block indicates relative depth of all pixels within the corresponding plurality of texture view blocks, and a spatial resolution of the texture view component and a spatial resolution of the depth view component are different.

In one example, the disclosure describes a computer-readable storage medium having stored thereon instructions that when executed, cause a processor of a device for coding video data to code a plurality of texture view blocks of a texture view component. In this example, the plurality of texture view blocks corresponds to a single depth view block of a depth view component. The instructions, when executed, also cause the processor to determine at least one of reference index information, partition information, and motion vector information of the single depth view block from a texture view block of the plurality of corresponding texture view blocks, and code the single depth view block based on at least one of the determined reference index, partition information, and motion vector information. In this example, the depth view component and the texture view component belong to a same view within an access unit, the single depth view block indicates relative depth of all pixels within the corresponding plurality of texture view blocks, and a spatial resolution of the texture view component and a spatial resolution of the depth view component are different.

In one example, the disclosure describes a device for coding video data. The device includes means for coding a plurality of texture view blocks of a texture view component. In this example, the plurality of texture view blocks corresponds to a single depth view block of a depth view component. The device also includes means for determining at least one of reference index information, partition information, and motion vector information of the single depth view block from a texture view block of the plurality of corresponding texture view blocks, and means for coding the single depth view block based on at least one of the determined reference index, partition information, and motion vector information. In this example, the depth view component and the texture view component belong to a same view within an access unit, the single depth view block indicates relative depth of all pixels within the corresponding plurality of texture view blocks, and a spatial resolution of the texture view component and a spatial resolution of the depth view component are different.

The details of one or more examples are set forth in the accompanying drawings and the description below. Other features, objects, and advantages will be apparent from the description and drawings, and from the claims.

DETAILED DESCRIPTION

Figure 1:
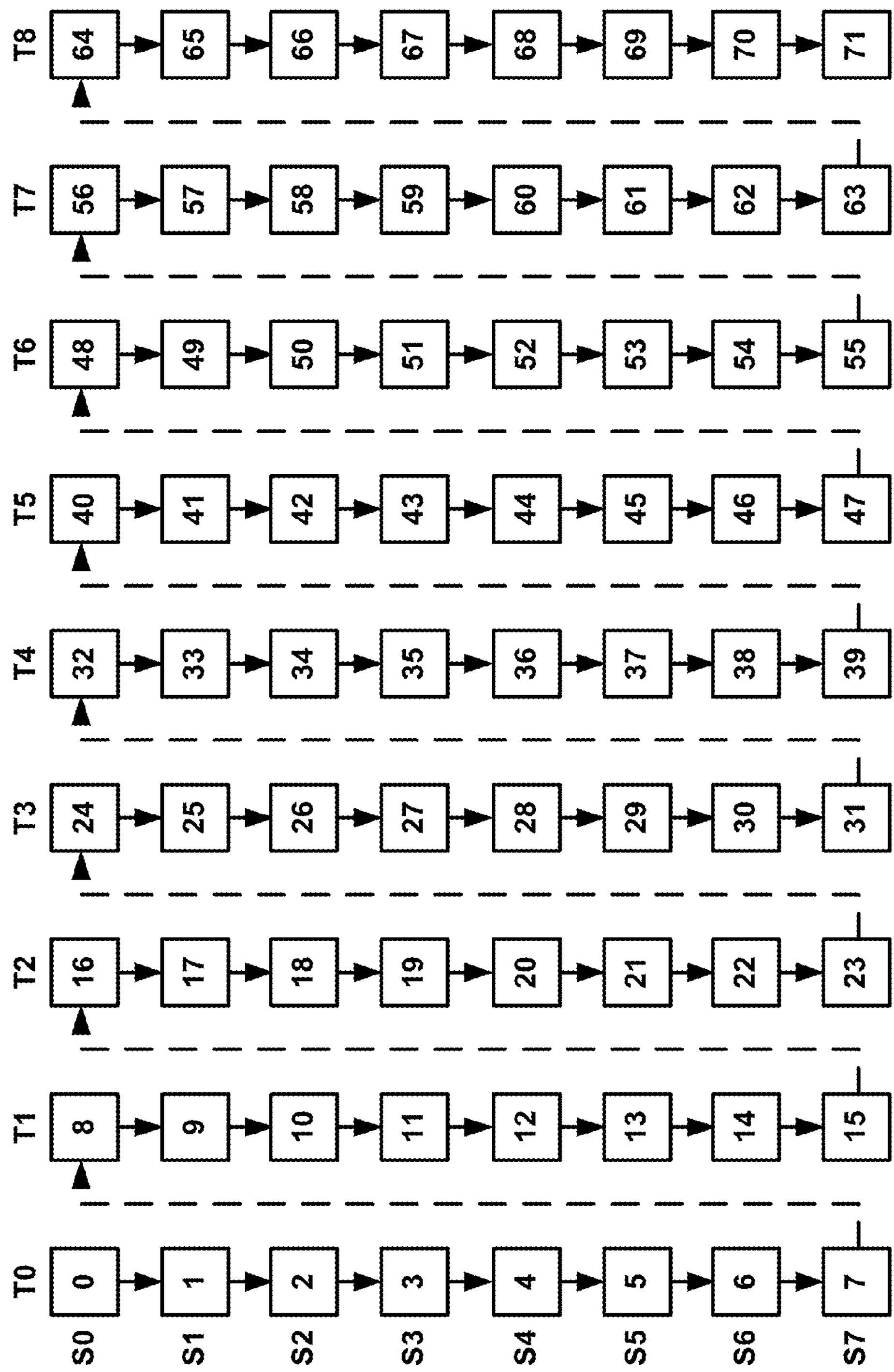
FIG. 1 is a graphical diagram illustrating an example multiview video coding (MVC) encoding or decoding order, in accordance with one or more examples described in this disclosure.

As described in more detail below, the techniques described in this disclosure allow for "Inside View Motion Prediction" (IVMP) where the spatial resolution of a texture view and its corresponding depth view are different. In examples where the spatial resolution of the texture view component and its corresponding depth view component are different, a depth view block, within the depth view component, may correspond to a plurality of texture view blocks, within the texture view component. Because the depth view block corresponds to multiple texture view blocks, there are potential issues in using motion information for the texture view blocks for predicting the motion information for the depth view block. The techniques described in this disclosure address these issues allowing for motion information for a depth view block to be predicted from texture view blocks even in examples where the spatial resolutions of the texture view component and its corresponding depth view component are different.

The techniques described in this disclosure are generally applicable to multiview video coding (MVC) and 3D video coding. Multiview video coding (MVC) refers to coding of video pictures that show scenes from different points of view (i.e., views). For example, there may be a plurality of views, and each view is considered as including a plurality of video pictures. When the video pictures from at least two of the views are displayed, the resulting video appears as a 3D video that emerges from or pushes into the display used to render the views.

The techniques described in this disclosure may be applicable to various video coding standards. Examples of the video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. In addition, there is a new video coding standard, namely High-Efficiency Video Coding (HEVC), being developed by the Joint Collaboration Team on Video Coding (JCT-VC) of ITU-T Video Coding Experts Group (VCEG) and ISO/IEC Motion Picture Experts Group (MPEG).

For purposes of illustration only, the techniques are described in context of the H.264/AVC standard including its MVC extension and 3D video extension. The H.264/AVC standard including its MVC extension may be also be referred to as the "H.264/AVC standard" or simply the "H.264" standard. Although the technique are described in context of H.264/AVC standard including its MVC extension, the techniques described in this disclosure may be extendable to other standards as well, such as the HEVC standard currently in development.

The recent, publicly available joint draft of MVC is described in "Advanced video coding for generic audiovisual services," ITU-T Recommendation H.264, March 2010. A more recent, publicly available joint draft of MVC is described in "Advanced video coding for generic audiovisual services," ITU-T Recommendation H.264, June 2011. A current joint draft of the MVC has been approved as of January 2012.

The plurality of video pictures for each view may be referred to as texture view components. Each texture view component has a corresponding depth view component. The texture view components include video content, and the depth view components may indicate relative depths of the pixels within the texture view components.

The techniques of this disclosure relate to coding 3D video data by coding texture and depth data. In general, the term "texture" is used to describe luminance (that is, brightness or "luma") values of an image and chrominance (that is, color or "chroma") values of the image. In some examples, a texture image may include one set of luminance data and two sets of chrominance data for blue hues (Cb) and red hues (Cr). In certain chroma formats, such as 4:2:2 or 4:2:0, the chroma data is downsampled relative to the luma data. That is, the spatial resolution of chrominance pixels is lower than the spatial resolution of corresponding luminance pixels, e.g., one-half or one-quarter of the luminance resolution.

Depth data generally describes depth values for corresponding texture data. For example, a depth image may include a set of depth pixels that each describes depth for corresponding texture data. The depth data may be used to determine horizontal disparity for the corresponding texture data. Thus, a device that receives the texture and depth data may display a first texture image for one view (e.g., a left eye view) and use the depth data to modify the first texture image to generate a second texture image for the other view (e.g., a right eye view) by offsetting pixel values of the first image by the horizontal disparity values determined based on the depth values. In general, horizontal disparity (or simply "disparity") describes the horizontal spatial offset of a pixel in a first view to a corresponding pixel in a second view, where the two pixels correspond to the same portion of the same object as represented in the two views.

In still other examples, depth data may be defined for pixels in a z-dimension perpendicular to the image plane, such that a depth associated with a given pixel is defined relative to a zero disparity plane defined for the image. Such depth may be used to create horizontal disparity for displaying the pixel, such that the pixel is displayed differently for the left and right eyes, depending on the z-dimension depth value of the pixel relative to the zero disparity plane. The zero disparity plane may change for different portions of a video sequence, and the amount of depth relative to the zero-disparity plane may also change. Pixels located on the zero disparity plane may be defined similarly for the left and right eyes. Pixels located in front of the zero disparity plane may be displayed in different locations for the left and right eye (e.g., with horizontal disparity) so as to create a perception that the pixel appears to come out of the image in the z-direction perpendicular to the image plane. Pixels located behind the zero disparity plane may be displayed with a slight blur, to slight perception of depth, or may be displayed in different locations for the left and right eye (e.g., with horizontal disparity that is opposite that of pixels located in front of the zero disparity plane). Many other techniques may also be used to convey or define depth data for an image.

For each pixel in the depth view component there may be one or more corresponding pixels in the texture view component. For instance, if the spatial resolution of the depth view component and the texture view component is the same, each pixel in the depth view component corresponds to one pixel in the texture view component. If the spatial resolution of the depth view component is less than that of the texture view component, then each pixel in the depth view component corresponds to multiple pixels in the texture view component. The value of the pixel in the depth view component may indicate the relative depth of the corresponding one or more pixels in the texture view.

In some examples, a video encoder signals video data for the texture view components and the corresponding depth view components for each of the views. A video decoder utilizes both the video data of texture view components and the depth view components to decode the video content of the views for display. A display then displays the multiview video to produce 3D video.

The texture view components may be coded in blocks of video data, which are referred to as "video blocks" and commonly called "macroblocks" in the H.264 context. Similarly, the depth view components are also coded as "video blocks," commonly called "macroblocks" in the H.264 standard. Each depth view block may have one or more corresponding texture view blocks. For example, if the spatial resolutions of the depth view component and the texture view component are the same, then each depth view block corresponds to one texture view block. If the spatial resolution of the texture view component is less than that of texture view component, then each depth view block corresponds to two or more texture view blocks.

The different video blocks (texture and depth), however, are usually coded separately. Other video coding standards may refer to video blocks as treeblocks or coding units (CUs).

The video blocks of a texture view component may be coded using intra-prediction (e.g., predicted with respect to other portions in the same texture view component) or inter-prediction (e.g., predicted with respect to portions in one or more other texture view components, includes texture view components from different views). For example, for inter-predicting a current texture view block, a video coder (e.g., video encoder or video decoder) identifies a block in another texture view component (referred to as a reference texture view component), and code (e.g., encode or decode) the residual between the current texture view block and the block of the reference texture view component. The block of the reference texture view component may be referred to as reference texture view block.

In addition, for inter-prediction, the video coder codes a motion vector that indicates a location of the reference texture view block in the reference texture view component and a reference index that identifies the reference texture view component. In some examples, the video coder utilizes two reference texture view components and two motion vectors to inter-predict the block of the current texture view component.

In general, the information used to predict a current texture view block may be referred to as motion information for the block. For inter-prediction, the motion information may be a partition mode, motion vectors, and the reference index, or any combination thereof.

It has been proposed to utilize the motion information that is used to predict a texture view block for also predicting a depth view block that corresponds to the texture view block. Again, a depth view block corresponds to a texture view block when the depth view block indicates relative depths of the pixels within the texture view block. Similarly, a depth view component corresponds to a texture view component when the depth view component indicates relative depths of the pixels within the texture view component. In some examples, the texture view component and the corresponding depth view component may be coded into the same video network abstraction layer (NAL) unit.

Utilizing the motion information used to predict a texture view block for predicting a depth view block that corresponds to the texture view block is referred to as "Inside View Motion Prediction" (IVMP). Such prediction is referred to as IVMP because motion information for a texture view block (i.e., information used to predict the texture view block) is used to predict a corresponding depth view block (e.g., adopted without any further modification). The depth view component, to which the depth view block belongs, and its corresponding texture view component, to which the texture view block belongs, may be considered as belonging to the same view, hence the phrase "Inside View Motion Prediction."

If the spatial resolution of the texture view component and the depth view component is the same, then for the block in the texture view component, there is one corresponding block in the corresponding depth view component. For this case, it has been proposed to inter-predict the block in the corresponding depth view component using the motion information of the block in the current texture view component, albeit with respect to other depth view components.

For example, as described above, the texture view block is inter-predicted with respect to the block in the reference texture view component (e.g., reference texture view block). In MVC and 3D video coding, there is a corresponding depth view component to the reference texture view component (referred to as reference depth view component). For predicting a depth view block in a current depth view component, the video coder may use the motion information of the corresponding texture view block in the corresponding texture view component to identify the reference texture view component that was used to code the texture view block.

From the reference texture view component, the video coder may identify the depth view component that corresponds to the reference texture view component (i.e., identify the reference depth view component). The video coder may also identify the depth view block in the reference depth view component that corresponds to the reference texture view block, where the reference texture view block was used to code the texture view block.

The video coder then codes the depth view block using the identified depth view block in the reference depth view component. In this manner, the video encoder may not need to signal the motion information for the depth view block, and the video decoder may not need to receive the motion information for the depth view block for purposes of reconstructing the depth view block.

In the previous example for using motion information for predicting depth view blocks, it was assumed that the spatial resolution of the texture view component and the spatial resolution of the depth view component is the same. However, this may not be the case in every instance. For bandwidth efficiency purposes, the spatial resolution of the depth view component may be less than the spatial resolution of the corresponding texture view component so that fewer amount of data needs to be signaled or received, as compared to if the spatial resolutions were the same.

For instance, the video coder downsamples the depth view component to reduce the spatial resolution, as one example. However, the techniques of this disclosure do not require downsampling for reducing the spatial resolution of the depth view component. In general, the examples described in this disclosure may utilize any technique that results in the spatial resolution of the depth view component to be different than the spatial resolution of the texture view component, including assigning one pixel of the depth view component to correspond to multiple pixels of the texture view component.

The spatial resolution of the depth view component may be a quarter or a half of the spatial resolution of the texture view component, as two examples. For quarter resolution, the video coder may downsample by two in each of the x and y dimensions for a total downsample by a factor of four. For half resolution, the video coder may downsample by two in either the x or the y dimension for a total downsample by a factor of 2.

It is possible for the spatial resolution of the depth view component to be some other fraction of the spatial resolution of the texture view component, including ratios greater than half and less than one, or less than a quarter. Solely for the purposes of illustration, many of the examples are described where the spatial resolution of the depth view component is a quarter of the spatial resolution of the texture view component. However, the techniques are extendable to other ratios as well such as half, eighth, sixteenth, and so forth, including non-dyadic ratios.

In instances where the spatial resolutions are different, it may be difficult to determine how to use the motion information for a texture view block for predicting a corresponding depth view block. For example, one video block in the depth view component corresponds to four video blocks in the texture view component when the spatial resolution of the depth view component is a quarter of the spatial resolution of the texture view component.

In this case, it may be possible that one or more of the four video blocks in the texture view component are predicted in different ways. For example, some of the four video blocks in the texture view component may be intra-predicted, and others may be inter-predicted. As another example, the motion vectors for the video blocks in the texture view component may be different. As yet another example, the partitioning of the video blocks in the texture view component may be such that the motion information of the partitions may not be usable for the corresponding depth view block. Other such issues may be present when the spatial resolution of the texture view component and the depth view component is different.

The techniques described in this disclosure determine whether the video coder should utilize inside view motion prediction (IVMP) among texture view components and depth view components with asymmetric spatial resolution (e.g., where the spatial resolutions are different). When the video coder determines that IVMP cannot be utilized, the video coder may still predict the partition of the depth view block in the depth view component from the partitions of one or more corresponding texture view blocks in the corresponding texture view component.

Also when the video coder does utilize IVMP, the techniques described in this disclosure determine the motion information for the depth view blocks from the corresponding texture view block when the spatial resolution of the depth view component and the texture view component is different. For example, the techniques determine at least one of the motion vector, reference index, and partition mode for the depth view block that is being predicted based on the motion information for the corresponding texture view blocks.

FIG. 1 is a graphical diagram illustrating an example multiview video coding (MVC) encoding or decoding order, in accordance with one or more examples described in this disclosure. For example, the decoding order arrangement illustrated in FIG. 1 is referred to as time-first coding. In FIG. 1, S0-S7 each refers to different views of the multiview video. T0-T8 each represents one output time instance. An access unit may include the coded pictures of all the views for one output time instance. For example, a first access unit may include all of the views S0-S7 for time instance T0, a second access unit may include all of the views S0-S7 for time instance T1, and so forth.

For purposes of brevity, the disclosure may use the following definitions:

view component: A coded representation of a view in a single access unit. When a view includes both coded texture and depth representations, a view component consists of a texture view component and a depth view component.

texture view component: A coded representation of the texture of a view in a single access unit.

depth view component: A coded representation of the depth of a view in a single access unit.

In FIG. 1, each of the views includes sets of pictures. For example, view S0 includes set of pictures 0, 8, 16, 24, 32, 40, 48, 56, and 64, view S1 includes set of pictures 1, 9, 17, 25, 33, 41, 49, 57, and 65, and so forth. Each set includes two pictures: one picture is referred to as a texture view component, and the other picture is referred to as a depth view component. The texture view component and the depth view component within a set of pictures of a view may be considered as corresponding to one another. For example, the texture view component within a set of pictures of a view is considered as corresponding to the depth view component within the set of the pictures of the view, and vice-versa (i.e., the depth view component corresponds to its texture view component in the set, and vice-versa). As used in this disclosure, a texture view component that corresponds to a depth view component may be considered as the texture view component and the depth view component being part of a same view of a single access unit.

The texture view component includes the actual image content that is displayed. For example, the texture view component may include luma (Y) and chorma (Cb and Cr) components. The depth view component may indicate relative depths of the pixels in its corresponding texture view component. As one example, the depth view component is a gray scale image that includes only luma values. In other words, the depth view component may not convey any image content, but rather provide a measure of the relative depths of the pixels in the texture view component.

For example, a purely white pixel in the depth view component indicates that its corresponding pixel or pixels in the corresponding texture view component is closer from the perspective of the viewer, and a purely black pixel in the depth view component indicates that its corresponding pixel or pixels in the corresponding texture view component is further away from the perspective of the viewer. The various shades of gray in between black and white indicate different depth levels. For instance, a very gray pixel in the depth view component indicates that its corresponding pixel in the texture view component is further away than a slightly gray pixel in the depth view component. Because only gray scale is needed to identify the depth of pixels, the depth view component need not include chroma components, as color values for the depth view component may not serve any purpose.

The depth view component using only luma values (e.g., intensity values) to identify depth is provided for illustration purposes and should not be considered limiting. In other examples, any technique may be utilized to indicate relative depths of the pixels in the texture view component.

In accordance with MVC, the texture view components are inter-predicted from texture view components in the same view or from texture view components in one or more different views, but in the same access unit. Similarly, the depth view components are inter-predicted from depth view components in the same view or from depth view components in one or more different views. The texture view components and the depth view components may be intra-predicted (e.g., a block within the texture or depth view component is predicted from another block within the same texture or depth view component) as well.

The texture view components may be coded in blocks of video data, which are referred to as "video blocks" and commonly called "macroblocks" in the H.264 context. Similarly, the depth view components are also coded as "video blocks," commonly called "macroblocks" in the H.264 standard. The different video blocks (texture and depth), however, are usually coded separately. Other video coding standards may refer to video blocks as treeblocks or coding units (CUs).

With inter coding, motion vectors are used to define predictive blocks, which are then used to predict the values of the coded video blocks. In this case, the so-called "residual values" or "difference values" are included in the encoded bitstream, along with the motion vectors that identify the corresponding predictive blocks. The decoder receives the motion vectors and the residual values, and uses the motion vectors to identify the predictive blocks from previously decoded video data. To reconstruct the encoded video blocks, the decoder combines the residual values with the corresponding predictive blocks identified by the motion vectors.

The techniques described in this disclosure are directed to using information used for predicting a block in the texture view component (i.e., a texture view block) for predicting a corresponding block in the corresponding depth view component (i.e., a corresponding depth view block in the corresponding depth view component). The information used for predicting a current texture view block is referred to as motion information. Examples of the motion information include partition mode (e.g., the manner in which a current texture view block is further partitioned), motion vector information (e.g., the motion vector used to predict the texture view block of the current texture view component), and reference index information (e.g., one or more indices into one or more reference picture lists that indicate one or more other texture view components that were used to inter-predict the current texture view block).

In other words, from the reference index information, it is possible to determine the reference texture view component or components used to inter-predict the current texture view block. From the motion vector, it is possible to determine the location or locations of block or blocks within the reference texture view component or components that were used to inter-predict the current texture view block.

The partition mode may indicate the manner in which the current texture view block was partitioned. For example, the H.264/AVC standard defines a macroblock (MB) to be 16×16 pixels. A 16×16 MB may be partitioned into smaller portions in four different ways: one 16×16 MB partition (i.e., no further division, such as P_Skip, B_Skip, B_Direct 16×16, P_L0_16×16, B_L0_16×16, B_L1_16×16 or B_Bi_16×16), two 16×8 MB partitions, two 8×16 MB partitions, or four 8×8 MB partitions. Each MB partition in one MB may be predicted from partitions in different reference texture view blocks. In other words, different MB partitions in one MB may have different reference index values.

For example, a partition may be predicted from one other partition of a reference texture view component, where the reference texture view component is identified in one of two reference picture lists (referred to RefPicList0 and RefPicList1). In some other examples, a partition may be predicted from two other partitions of two different reference texture view components, where one of the reference texture view component is identified in RefPicList0 and the other reference texture view component is identified in RefPicList1. When a partition is predicted from one other partition, the partition is referred to as uni-directionally predicted, and when a partition is predicted from two partitions, the partition is referred to as bi-predicted.

When a MB is not partitioned into four 8×8 MB partitions, the MB may have one motion vector for each MB partition in each direction, where term direction is used to indicate whether the partition is inter-predicted with respect to a picture in RefPicList0, RefPicList1, or a both RefPicList0 and RefPicList1. For example, if one MB is coded as two 16×8 MB partitions, each of the two 16×8 partitions is predicted from respective 16×8 partitions in the reference texture view block if uni-directionally predicted and one motion vector is assigned for each 16×8 partition (e.g., predicted in one direction). Each is predicted from respective 16×8 partitions in the two reference texture view blocks if bi-predicted and two motion vectors are assigned for each 16×8 partition for each reference picture list (e.g., predicted in both directions). In some examples, one reference texture view block may include both the 16×8 partitions used to inter-predict each of the 16×8 partitions; however, aspects of this disclosure are not so limited. The same would apply for two 8×16 partitions.

In some examples, when a MB is partitioned into four 8×8 MB partitions, each 8×8 MB partition is further partitioned into sub-blocks. Each of these sub-blocks may be uni-directionally predicted or bi-predicted from different sub-blocks in different reference texture view components. There may be four different ways to further partition an 8×8 MB partition into the sub-blocks. The four ways include one 8×8 sub-block (i.e., no further division), two 8×4 sub-blocks, two 4×8 sub-blocks, and four 4×4 sub-blocks.

As described above, the techniques described in this disclosure are related to using motion information for a texture view block for predicting (e.g., coding) a corresponding depth view block. In particular, the techniques described in this disclosure are related to situations where the spatial resolution of the texture view component and its corresponding depth view component is different.

For example, because the depth view component may be represented with a gray scale, the depth view component may appear as if it is a black and white version of the corresponding texture view component. In this case, the depth view component and the corresponding texture view component may have similar object silhouette. Since the texture view component and its corresponding depth view component have similar object silhouette, they may have similar object boundary and movement, thus there may be redundancy in their motion fields (i.e., motion information).

For situations where the spatial resolution of the depth view component and its corresponding spatial view component is the same, techniques have been proposed where motion information from a texture view component is reused for the corresponding depth view component. The reuse of motion information such as motion prediction from a texture view component to the corresponding depth view component can be enabled as a new mode. In these examples, the Inside View Motion Prediction (IVMP) mode is enabled for an Inter coded MB (i.e., inter-predicted MB) only in depth view components. In IVMP mode, the motion information, including partition mode represented by mb_type, sub_mb_type, reference indices and motion vectors of the corresponding MB in texture view component is reused by the depth view component of the same view. A flag can be signaled in each MB of the depth view component to indicate whether it uses the IVMP mode.

The mb_type indicates the manner in which a macroblock is partitioned (i.e., whether a 16×16 MB is partitioned into one 16×16 MB partition, into two 16×8 MB partitions, into two 8×16 MB partitions, or into four 8×8 MB partitions). The sub_mb_type indicates the manner in which an 8×8 partition is further partitioned (i.e., whether the 8×8 partition is partitioned into one 8×8 sub-block, into two 8×4 sub-blocks, into two 4×8 sub-blocks, or into four 4×4 sub-blocks).

When enabled, the IVMP mode allows the depth view component to fully adopt the motion information of the corresponding texture view component, in a manner similar to so-called "merge." In this case, the depth view component may not include any additional delta values with respect to its motion information, and instead, adopts the motion information of the texture view component as its motion information. By defining a mode that fully adopts motion information of a texture view as the motion information of a depth view, without any signaling of delta values with respect to such motion information, improved compression may be achieved.

While the IVMP mode may function well for instances where the spatial resolution of the depth view component and the texture view component is the same, there may be certain issues that are present when the spatial resolution of the depth view component and the texture view component is different. For example, in FIG. 1, the set of pictures 0 of view S0 includes a texture view component and a corresponding depth view component. In examples described in this disclosure, the spatial resolution of the texture view component and the corresponding depth view component may be different. For instance, the spatial resolution of the depth view component is half or a quarter of the spatial resolution of the corresponding texture view component, although other ratios of the spatial resolutions are possible.

When the spatial resolution of the depth view component is less than the spatial resolution of the texture view component, a MB in the depth view component corresponds to multiple MBs in the corresponding texture view component. For example, if the spatial resolution of the depth view component is a quarter of that of the texture view component, then a 16×16 MB in the depth view component corresponds to four 16×16 MBs in the texture view component. Because one MB in the depth view component corresponds to multiple MBs in the corresponding texture view component, it may be unclear whether motion information from the texture view MBs can be used for predicting the motion information for the depth view MB. Also, if such motion information can be used for predicting the motion information for the depth view MB, it may be unclear as to which motion information of which MB of the texture view component should be used.

For example, assume that one or more of the MBs in the texture view component are intra-coded (i.e., intra-predicted), and the others are inter-coded (i.e., inter-predicted). In this example, it may be unclear whether the MB of the depth view component that corresponds to these MBs of the texture view component should intra-coded or inter-coded.

As another example, assume that one of the MBs in the texture view component is partitioned with more than one MB partitions with different reference index values for each partition. The reference index values identify reference texture view components in one or two reference picture lists referred to as RefPicList0 and RefPicList1. For example, assume that one of the MBs in the texture view component is partitioned into four 8×8 partitions, two 16×8 partitions, or two 8×16 partitions. In this case, each of these partitions corresponds to sub-blocks of a MB in the depth view component that is smaller than 8×8.

For instance, if the spatial resolution of the depth view component is a quarter of the spatial resolution of the texture view component, then each one of the 8×8 partitions of the MB in the texture view component corresponds to a 4×4 sub-block of the MB in the depth view component that corresponds to the MBs of the texture view component. Similarly, each one of the 16×8 partitions or 8×16 partitions of the MB in the texture view component corresponds to an 8×4 sub-block or 4×8 sub-block, respectively, of the MB in the depth view component that corresponds to the MBs of the texture view component.

In this example, each of the 4×4 sub-blocks, 8×4 sub-blocks, and 4×8 sub-blocks in the depth view component is smaller in size than 8×8. The H.264/AVC standard may not allow blocks smaller than 8×8 that are within the same partition to be predicted with respect to different references. For example, assume that the texture view block is partitioned into four 8×8 MB partitions, and that a first 8×8 partition and a second 8×8 partition of the four 8×8 partitions are predicted from different reference texture view components. In this example, the first 8×8 partition in the texture view block corresponds to a first 4×4 sub-block in an 8×8 partition of a depth view block, and the second 8×8 partition in the texture view block corresponds to a second 4×4 sub-block in the same 8×8 partition of the depth view block.

Therefore, in this example, the first 4×4 sub-block in the depth view block, and the second 4×4 sub-block in the depth view block would need to be predicted from different reference depth view components because the first 8×8 partition and the second 8×8 partition in the texture view block are predicted from different reference texture view components. However, the H.264/AVC standard may not allow for such prediction. For example, in H.264/AVC, two sub-blocks that belong to the same partition may not be allowed to be predicted from different reference components (i.e., the reference index values for each of the sub-blocks may be required to be the same to be compliant with H.264/AVC).

In the above described scheme, where the texture view block is partitioned to more than one partition, and two or more of the partitions are predicted with respect to different reference texture view components, this may result in depth view blocks that need to be predicted in violation of the H.264/AVC standard. This is another example of issues that are present when the spatial resolutions of the texture view component and the depth view component are different.

As yet another example of issues that may be present when the spatial resolutions are different, it may be possible that a texture view block is partitioned into more than one MB partition, and the reference index values for each of the MB partitions are the same. For example, a 16×16 texture view block may be partitioned into four 8×8 partitions, and each of the 8×8 partitions in the texture view block is predicted from the same reference texture view component or components.

In this example, the corresponding sub-blocks in the 8×8 partition of the depth view block would be predicted from the same reference depth view component or components, in compliance with the H.264/AVC standard. However, if one of the 8×8 partitions in the texture view block was further partitioned into sub-blocks, then there may be multiple motion vectors that map to one 4×4 sub-block in the 8×8 partition of the depth view block.

For instance, assume that a first partition of the four 8×8 partitions in the texture view block is further partitioned into four 4×4 sub-blocks identified as first to fourth sub-blocks of the texture view block. In this example, the first partition of the four 8×8 partitions in the texture view block corresponds to one 4×4 sub-block in the corresponding depth view block. Also, in this example, the first to fourth sub-blocks of the first 8×8 partition in the texture view block are predicted with different motion vectors, albeit motion vectors that point to the same reference texture view component. Therefore, in this example, it is unclear as to which one of the motion vectors among the motion vectors for the first to fourth sub-blocks of the texture view block should be used as the motion vector for the 4×4 sub-block in the corresponding depth view block.

As described in more detail, the techniques of this disclosure address these or other issues that are present when the spatial resolutions of the texture view component and the depth view component are different. For instance, the techniques described in this disclosure support Inside View Motion Prediction (IVMP) with asymmetric resolution (e.g., when spatial resolution of the depth view component is less than the spatial resolution of the texture view component).

For example, even when the spatial resolutions are different, the techniques described in this disclosure determine motion information for a depth view block from motion information for a corresponding texture view block. In some examples, the motion information that the techniques of this disclosure determine for the depth view block may include partition mode information, reference index information, and motion vector information.

In particular, the techniques described in this disclosure may allow for a video coder, such as a video encoder or a video decoder, to perform partition mode prediction, reference index prediction, and motion vector prediction for coding (e.g., encoding or decoding) a macroblock in the depth view component based on the partition mode information, reference index information, and motion vector information for one or more macroblocks in the texture view component that correspond to the macroblock in the depth view component. For purposes of illustration, the techniques are described with examples where the spatial resolution of the depth view component is a quarter or a half of the spatial resolution of the texture view component. However, aspects of this disclosure are not limited to these specific spatial resolution ratios between the texture view component and the depth view component.

Prior the describing example manners in which a video coder performs motion information prediction for the depth view block, FIGS. 2-4B provide some additional context.

Figure 2:
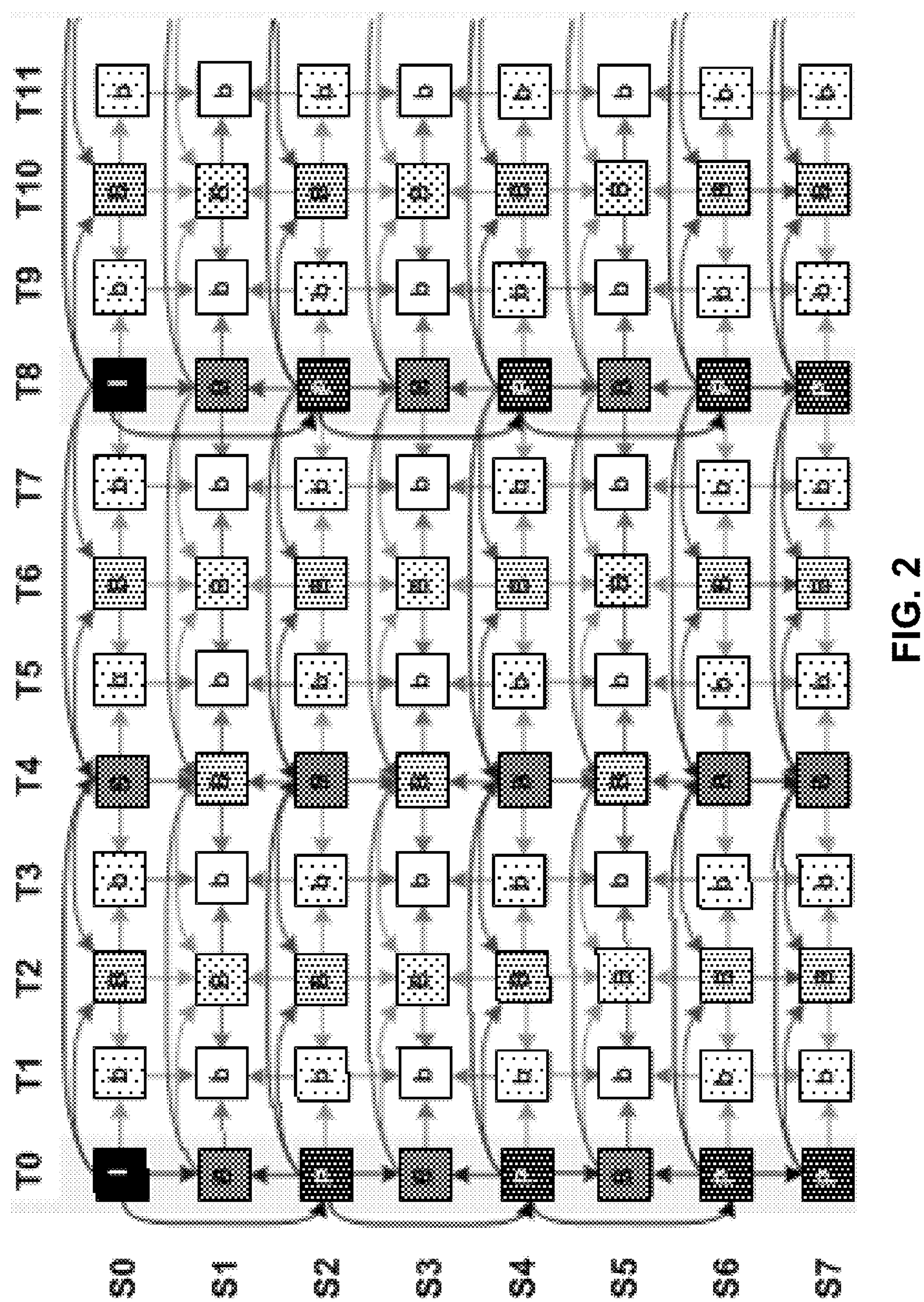
FIG. 2 is a conceptual diagram illustrating an example MVC prediction pattern.
Figure 3:
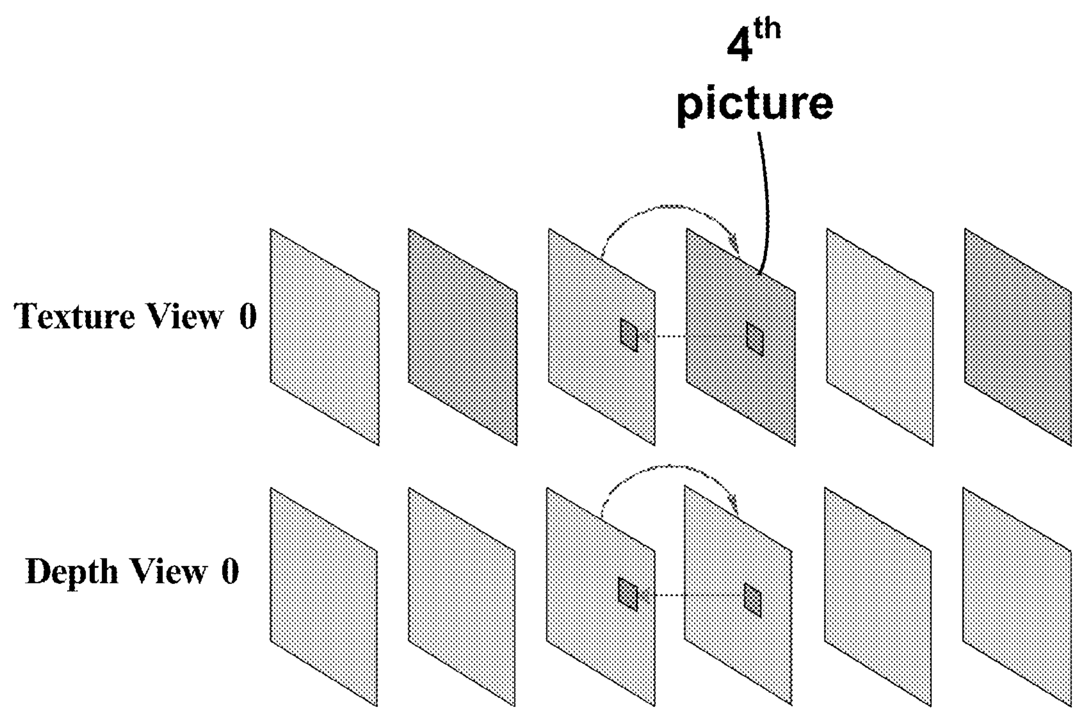
FIG. 3 is a conceptual illustration of a sequence of pictures that form a video sequence, in which an identified macroblock in the 4-th picture of the depth view component and the motion vector of the corresponding macroblock in the 4-th picture of the texture view is reused in the depth view component.
Figure 4A:
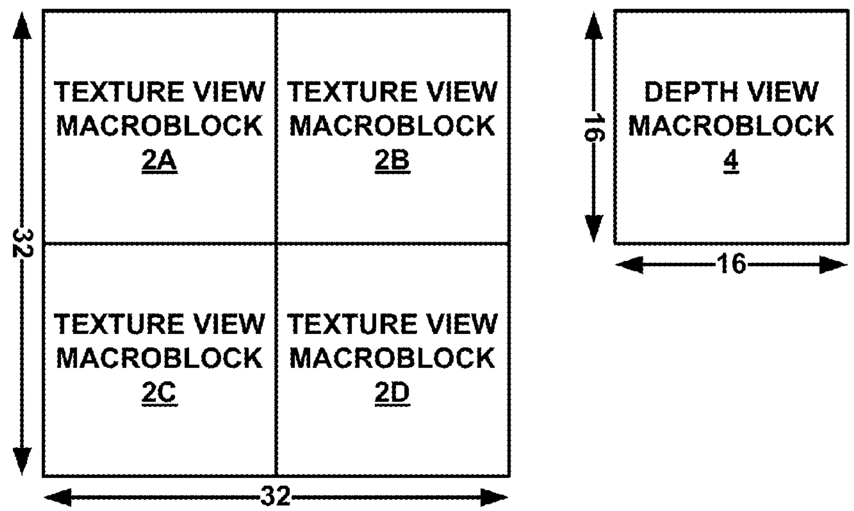
FIGS. 4A and 4B are conceptual diagram of texture view blocks and depth view blocks where the spatial resolutions of the texture view components and the depth view components is different.
Figure 4B:
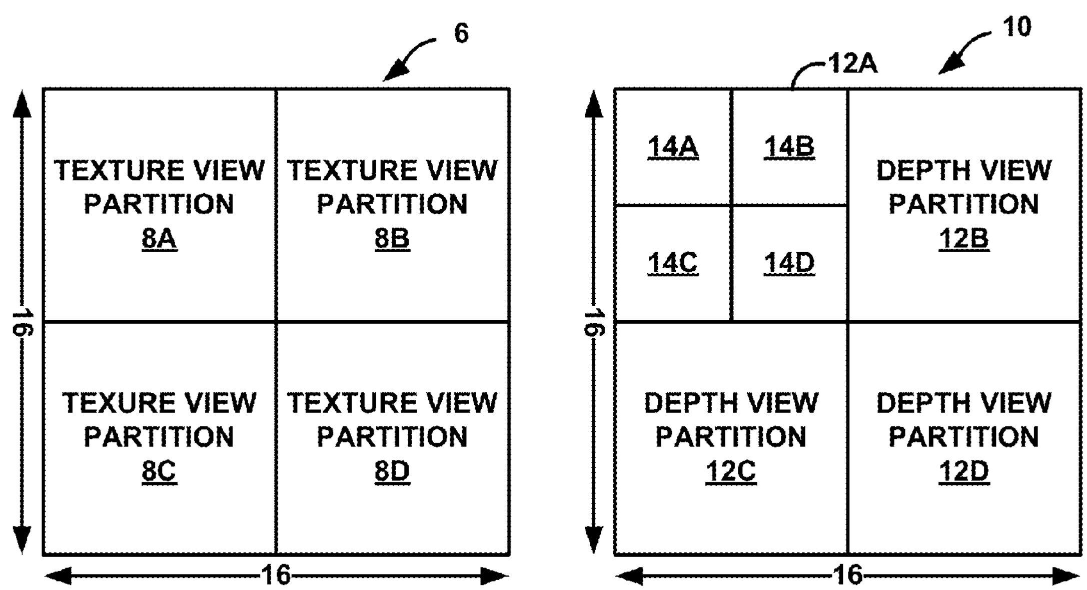

For example, FIG. 2 further illustrates multiview video coding. FIGS. 3, 4A, and 4B further illustrate potential issues that may arise when the spatial resolutions of the texture view component and the depth view component are different.

FIG. 2 is a conceptual diagram illustrating an example MVC prediction pattern. In the example of FIG. 2, eight views (having view IDs "S0" through "S7") are illustrated, and twelve temporal locations ("T0" through "T11") are illustrated for each view. That is, each row in FIG. 2 corresponds to a view, while each column indicates a temporal location.

Although MVC has a so-called base view which is decodable by H.264/AVC decoders and stereo view pair could be supported also by MVC, the advantage of MVC is that it could support an example that uses more than two views as a 3D video input and decodes this 3D video represented by the multiple views. A renderer of a client having an MVC decoder may expect 3D video content with multiple views.

Pictures in FIG. 2 are indicated at the intersection of each row and each column in FIG. 2. The H.264/AVC standard may use the term frame to represent a portion of the video. This disclosure may use the term picture and frame interchangeably.

The pictures in FIG. 2 are illustrated using a shaded block including a letter, designating whether the corresponding picture is intra-coded (that is, an I-picture), or inter-coded in one direction (that is, as a P-picture) or in multiple directions (that is, as a B-picture). In general, predictions are indicated by arrows, where the pointed-to pictures use the pointed-from picture for prediction reference. For example, the P-picture of view S2 at temporal location T0 is predicted from the I-picture of view S0 at temporal location T0.

As with single view video encoding, pictures of a multiview video coding video sequence may be predictively encoded with respect to pictures at different temporal locations. For example, the b-picture of view S0 at temporal location T1 has an arrow pointed to it from the I-picture of view S0 at temporal location T0, indicating that the b-picture is predicted from the I-picture. Additionally, however, in the context of multiview video encoding, pictures may be inter-view predicted. That is, a view component can use the view components in other views for reference. In MVC, for example, inter-view prediction is realized as if the view component in another view is an inter-prediction reference. The potential inter-view references are signaled in the Sequence Parameter Set (SPS) MVC extension and can be modified by the reference picture list construction process, which enables flexible ordering of the inter-prediction or inter-view prediction references.

FIG. 2 provides various examples of inter-view prediction. Pictures of view S1, in the example of FIG. 2, are illustrated as being predicted from pictures at different temporal locations of view S1, as well as inter-view predicted from pictures of views S0 and S2 at the same temporal locations. For example, the b-picture of view S1 at temporal location T1 is predicted from each of the B-pictures of view S1 at temporal locations T0 and T2, as well as the b-pictures of views S0 and S2 at temporal location T1.

In the example of FIG. 2, capital "B" and lowercase "b" are used to indicate different hierarchical relationships between pictures, rather than different coding methodologies. In general, capital "B" pictures are relatively higher in the prediction hierarchy than lowercase "b" frames. FIG. 2 also illustrates variations in the prediction hierarchy using different levels of shading, where a greater amount of shading (that is, relatively darker) frames are higher in the prediction hierarchy than those frames having less shading (that is, relatively lighter). For example, all I-pictures in FIG. 2 are illustrated with full shading, while P-pictures have a somewhat lighter shading, and B-pictures (and lowercase b-pictures) have various levels of shading relative to each other, but always lighter than the shading of the P-pictures and the I-pictures.

In general, the prediction hierarchy is related to view order indexes, in that pictures relatively higher in the prediction hierarchy should be decoded before decoding pictures that are relatively lower in the hierarchy, such that those frames relatively higher in the hierarchy can be used as reference pictures during decoding of the pictures relatively lower in the hierarchy. A view order index is an index that indicates the decoding order of view components in an access unit. The view order indices are implied in the SPS MVC extension, as specified in Annex H of H.264/AVC (the MVC amendment). In the SPS, for each index i, the corresponding view_id is signaled. The decoding of the view components shall follow the ascending order of the view order index. If all the views are presented, then the view order indexes are in a consecutive order from 0 to num_views_minus_1.

In this manner, pictures used as reference pictures are decoded before decoding the pictures that are encoded with reference to the reference pictures. A view order index is an index that indicates the decoding order of view components in an access unit. For each view order index i, the corresponding view_id is signaled. The decoding of the view components follows the ascending order of the view order indexes. If all the views are presented, then the set of view order indexes may comprise a consecutively ordered set from zero to one less than the full number of views.

For certain pictures at equal levels of the hierarchy, decoding order may not matter relative to each other. For example, the I-picture of view S0 at temporal location T0 is used as a reference picture for the P-picture of view S2 at temporal location T0, which is in turn used as a reference picture for the P-picture of view S4 at temporal location T0. Accordingly, the I-picture of view S0 at temporal location T0 should be decoded before the P-picture of view S2 at temporal location T0, which should be decoded before the P-picture of view S4 at temporal location T0. However, between views S1 and S3, a decoding order does not matter, because views S1 and S3 do not rely on each other for prediction, but instead are predicted only from views that are higher in the prediction hierarchy. Moreover, view S1 may be decoded before view S4, so long as view S1 is decoded after views S0 and S2.

In this manner, a hierarchical ordering may be used to describe views S0 through S7. Let the notation SA>SB mean that view SA should be decoded before view SB. Using this notation, S0>S2>S4>S6>S7, in the example of FIG. 2. Also, with respect to the example of FIG. 2, S0>S1, S2>S1, S2>S3, S4>S3, S4>S5, and S6>S5. Any decoding order for the views that does not violate these requirements is possible. Accordingly, many different decoding orders are possible, with only certain limitations.

In some examples, FIG. 2 may be viewed as illustrating the texture view components. For example, the I-, P-, B-, and b-pictures illustrated in FIG. 2 may be considered as texture view components for each of the views. In accordance with the techniques described in this disclosure, for each of the texture view components illustrated in FIG. 2 there is a corresponding depth view component, which a different spatial resolution. In some examples, the depth view components may be predicted in a manner similar to that illustrated in FIG. 2 for the corresponding texture view components.

However, in some examples, it may not be necessary for a video encoder to encode a bitstream signal or for a video decoder to receive and decode information that indicates the manner in which one or more macroblocks within a depth view component is predicted. For example, it is possible for a macroblock in the depth view component to adopt the motion information from one of the corresponding macroblocks in the texture view component. In this manner, delta values or any additional such information may not be needed for coding a macroblock in the depth view component.

Whether or not a macroblock, a partition of the macroblock, or a sub-block of the partition, in the depth view component, can adopt reference index information and motion vector information may be based on an Inside View Motion Prediction (IVMP) flag. For example, if the video encoder signals the IVMP flag as true for a macroblock in the depth view component (e.g., a depth view block), then the video decoder adopts reference index information and motion vector information, and determine the partition mode for the depth view block utilizing based on one of the corresponding macroblocks in the texture view component (e.g., corresponding texture view block).

In some examples, even when the IVMP flag is false for the depth view block, it is possible for the video decoder to determine the partition mode for the depth view block. In such examples, the video encoder may need to signal in the coded bitstream and the video decoder may need to receive from the coded bitstream information regarding the manner in which the depth view block is to be predicted. Otherwise, when the IVMP flag is true for the depth view block, the video encoder may not need to signal in the coded bitstream and the video decoder may not need to receive from the coded bitstream information regarding the manner in which the depth view block is to be predicted. Rather, the video decoder may reuse motion information for one of the corresponding texture view blocks to determine the manner in which the depth view block is to be predicted.

FIG. 3 is a conceptual illustration of a sequence of pictures that form a video sequence, in which an identified macroblock in the 4-th picture of the depth view component and the motion vector of the corresponding macroblock in the 4-th picture of the texture view is reused in the depth view component. In FIG. 3, the spatial resolution of the depth view component and the texture view component may be the same, as illustrated. This is to further illustrate the IVMP mode.

In some examples, the Inside View Motion Prediction (IVMP) mode may be enabled only for inter-coded (i.e., inter-predicted) MBs with depth view components. In IVMP mode, the motion information, including mb_type, sub_mb_type, reference indices and motion vectors of the corresponding MB in texture view component is reused by the depth view component of the same view. A flag may be signaled in each MB to indicate whether it uses the IVMP mode. As shown in FIG. 3, the flag may be true for the identified MB in the 4-th picture of the depth view and the motion vector of the corresponding MB in the 4-th picture of the texture view (identified as the $4^{th}$ picture) is reused for the highlighted MB in the depth view component. Note that, in some examples, the IVMP mode applies only to non-anchor pictures.

Again, relative to conventional techniques that predict a motion vector for one view based on the motion of another view, the techniques associated with IVMP may achieve further compression. For example, some conventional scalable techniques allow for motion prediction of an enhancement view based on the motion information of a base view, and in some cases, the base view may be a texture view and the enhancement view may be a depth view. In such cases, however, residual data (e.g., a delta) is always coded in addition to the prediction information (or flag) that indicates that the base view is used to predict the enhancement view. In contrast the techniques of this disclosure may utilize an IVMP mode in which no delta information is coded or allowed. Instead, with the IVMP mode, the motion information of the texture view is adopted as the motion information of the depth view.

Using motion information of a texture view block for predicting a depth view block may function well when the spatial resolutions of the texture view blocks and the depth view blocks are the same. However, as described above, certain issues may be present when the spatial resolutions are different. This is illustrated in greater detail in FIGS. 4A and 4B.

FIGS. 4A and 4B are conceptual diagram of texture view blocks and depth view blocks where the spatial resolutions of the texture view components and the depth view components is different. For ease of description, in FIGS. 4A and 4B, the spatial resolution of the depth view component is a quarter the spatial resolution of the texture view component. Therefore, in FIGS. 4A and 4B, one MB in the depth view component corresponds to four MBs in the texture view component.

Also, in FIGS. 4A and 4B, the depth view component corresponds to the texture view component. For example, the texture view component and the depth view component are part of a same view of a single access unit. For instance, set of pictures 33 in FIG. 1 include a texture view component and a depth view component of a same view (i.e., view S1) of a single access unit (i.e., at the time instance T4). Set of pictures 33 was selected at random to assist with understanding.

FIG. 4A illustrates texture view macroblocks 2A-2D and depth view macroblock 4. Texture view macroblocks 2A-2D are one example of a texture view block, and depth view macroblock 4 is one example of a depth view block. Texture view macroblocks 2A-2D are each examples of a macroblock in a texture view component. For example, each individual one of texture view blocks 2A-2D is 16 pixels in length by 16 pixels in width (i.e., 16×16). Depth view macroblock 4 is an example of a macroblock in a depth view component. For example, depth view macroblock 4 is a 16×16 block of pixels. In FIG. 4A, texture view macroblocks 2A-2D correspond with depth view macroblock 4 because the spatial resolution of the depth view component that includes depth view block 4 is a quarter the spatial resolution of the texture view component that includes texture view macroblocks 2A-2D.

In this example, it may be desirable to use motion information from one of texture view macroblocks 2A-2D to predict the motion information for one 8×8 block of depth view macroblock 4. However, if one or more of texture view macroblocks 2A-2D are intra-predicted, and the others are inter-predicted, then the prediction mode for depth view macroblock 4 may be unknown (i.e., it may be unknown whether depth view block 4 should be intra-predicted or inter-predicted). This is because all four of texture view macroblocks 2A-2D correspond to depth view macroblock 4. As described in more detail, the examples described in this disclosure provide for the manner in which a video encoder and a video decoder handle such instances where some of the corresponding macroblocks in the texture view macroblock are intra-predicted and others are inter-predicted in determining the motion information for the corresponding depth view macroblock.

FIG. 4B illustrates texture view macroblock 6 and depth view macroblock 10, both of which are 16×16 blocks of pixels. Depth view macroblock 10 is partitioned into depth view partitions 12A-12D. Each one of depth view partitions 12A-12D is 8×8 blocks of pixels. Depth view partitions 12A-12D is another example of a depth view block.

Because of spatial resolution of the depth view component is a quarter of that of the texture view component, each one of the 8×8 depth view partitions 12A-12D correspond to an entire 16×16 texture view macroblock. For example, the 8×8 depth view partition 12A corresponds to the entire 16×16 texture view macroblock 6. Depth view partitions 12B-12D correspond to entire 16×16 texture view macroblocks that neighbor texture view macroblock 6.

As illustrated, texture view macroblock 6 is partitioned into four 8×8 texture view partitions 8A-8D. It may be possible to partition texture view macroblock 6 into two 8×16 partitions, or two 16×8 partitions. Texture view partitions 8A-8D are another example of a texture view block.

In FIG. 4B, because texture view macroblock 6 corresponds to depth view partition 12A, texture view partitions 8A-8D correspond to depth view sub-blocks 14A-14D. Depth view sub-blocks 14A-14D are another example of a depth view block. For example, depth view partition 12A may be further partitioned into four 4×4 depth view sub-blocks 14A-14D. Each one of these 4×4 depth view sub-blocks 14A-14D correspond to respective ones of texture view partitions 8A-8D. For example, 8×8 texture view partition 8A corresponds to 4×4 depth view sub-block 14A, 8×8 texture view partition 8B corresponds to 4×4 depth view sub-block 14B, and so forth.

In some examples, each one of texture partitions 8A-8D may be inter-predicted with different reference texture view components. For example, as described above, one or more texture view components that are used as reference texture view components are identified in reference picture lists referred as RefPicList0 and RefPicList1. A reference index is an index into one of these lists that is used to identify the reference texture view component. If one of texture view partitions 8A-8D is inter-predicted with respect to one reference texture view component (e.g., in one direction), then, there is one reference index, into either RefPicList0 or RefPicList1, for that one of texture view partitions 8A-8D. If one of texture view partitions 8A-8D is inter-predicted with respect to two reference texture view components (e.g., in two directions), then, there are two reference indices, one for RefPicList0 and one for RefPicList1, for that one of texture view partitions 8A-8D.

It may be possible that the reference index or indices of texture view partitions 8A-8D are different if texture view partitions 8A-8D are inter-predicted with different reference texture view components. This would require for one or more of depth view sub-blocks 14A-14D to be inter-predicted from different reference depth view components.

However, some standards, such as the H.264/AVC with the MVC extension, may not allow for such a result. For example, the H.264 standard may require that for blocks smaller than 8×8 in size that are within a sub-blocks, such blocks must be inter-predicted from the same reference. For instance, depth view sub-blocks 14A-14D are 4×4, and therefore smaller in size than 8×8. Accordingly, the H.264 standard may require that all of depth view sub-blocks 14A-14D must be inter-predicted from the same reference depth view component. However, if one or more of texture view partitions 8A-8D are inter-predicted with respect to different reference texture view components, this would result in depth view sub-blocks 14A-14D being predicted with respect to different reference depth view components, which may not be allowed in the H.264 standard. As described in more detail, the examples described in this disclosure provide for techniques to address such a situation.

In some alternate examples, it may be possible that each one of texture view partitions 8A-8D is inter-predicted with respect to the same reference texture view component or components (e.g., the reference index or indices into RefPicList0 and/or RefPicList1 are the same based on whether the partitions are uni-directionally predicted or bi-predicted). In this case, each one of depth view sub-blocks 14A-14D would be predicted from the same reference depth view component, which would be in compliance with the requirements of the H.264 standard.

However, even in this case, the motion vectors for one or more of texture view partitions 8A-8D may be different. For example, the motion vector for texture view partition 8A and the motion vector for texture view partition 8B may be different, although both motion vectors are pointed from the same reference texture view component. In this case, it may be unclear which motion vector to use for inter-predicting depth view partition 12A. The examples described in this disclosure provide for techniques to address such a situation.

In particular, the examples described in this disclosure are described in context of a video encoder and a video decoder. A video encoder consistent with this disclosure may generally conform to the joint multiview video coding (JMVC) encoder scheme. In this case, views are encoded one by one. Inside each view, the texture sequence is firstly encoded, and the depth sequence is then encoded.

When IVMP mode is enabled, during texture view component encoding, the motion field of each texture view component is written into a motion file, the name of which can be specified in a configure file. When encoding the corresponding depth components of the same view, the motion file can be read for reference.

The video decoder may be similar to a JMVC decoder, with the modification of also decoding and outputting a depth sequence for each view. Other video coding encoders may refer to 3D-ATM and 3D-HTM which are used for AVC-based/HEVC-based multiview/3D video coding standards. When IVMP mode is enabled, the motion of each texture view component is stored and adopted as the motion of each corresponding depth view. For any blocks in which the IVMP mode is disabled, the depth view may include its own motion information, or may include some other syntax elements to identify where to obtain, predict or adopt its respective motion information.

Figure 5:
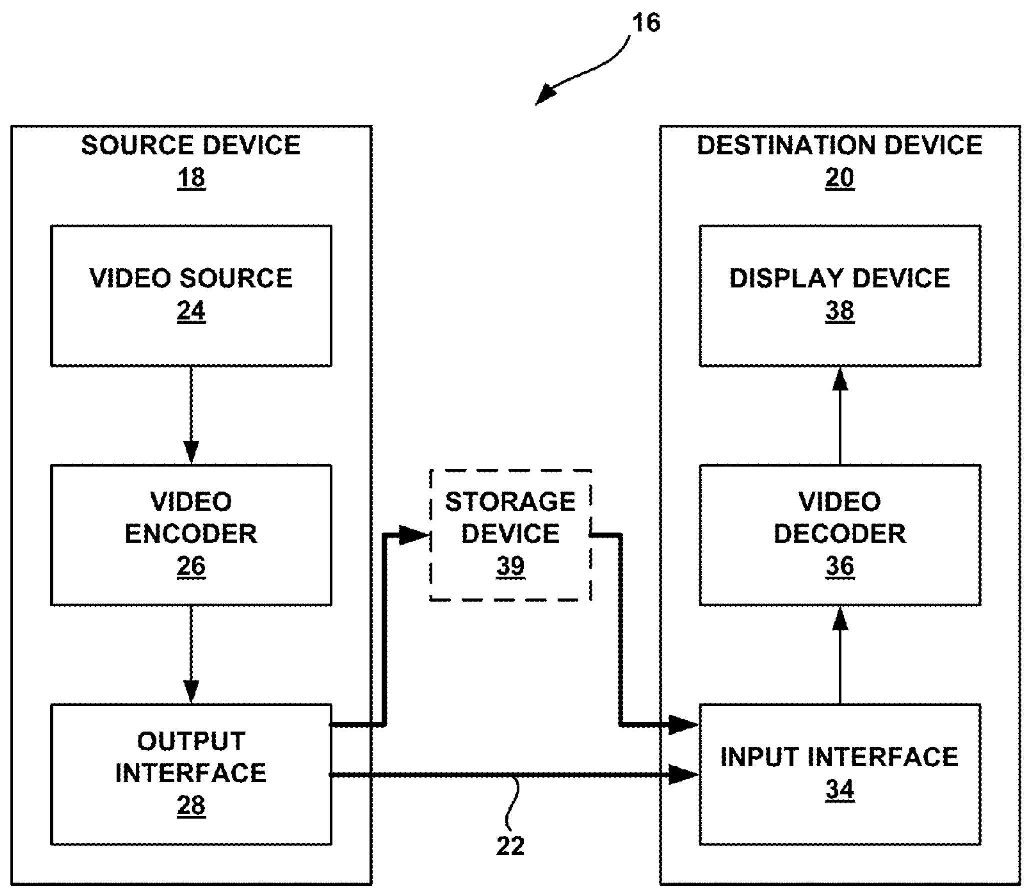
FIG. 5 is a block diagram illustrating an example video encoding and decoding system that may utilize the techniques described in this disclosure.
Figure 6:
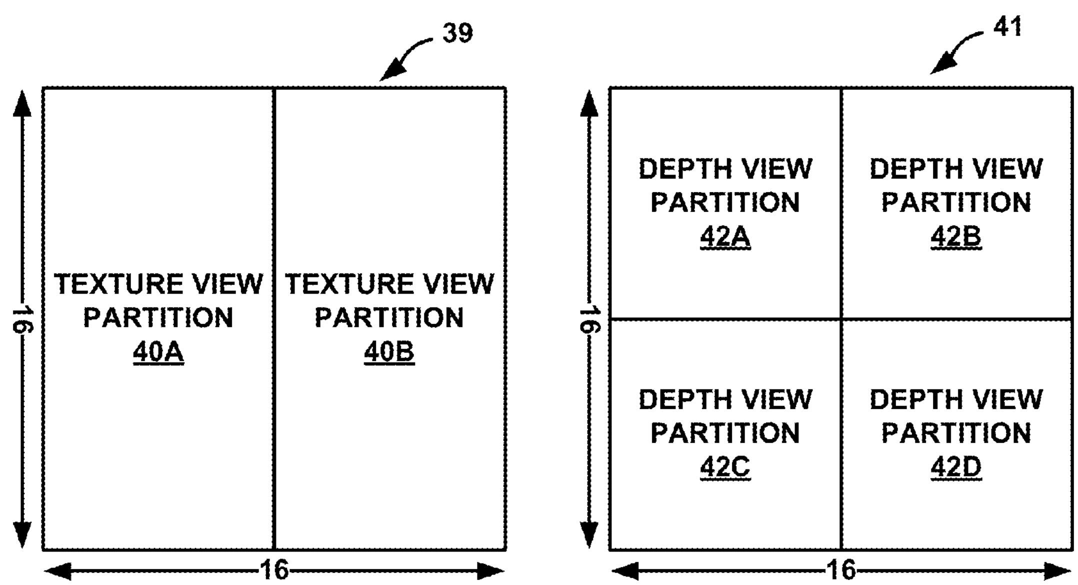
FIG. 6 is conceptual diagram of texture view blocks and depth view blocks for determining reference index and motion vector information for a depth view partition.
Figure 7:
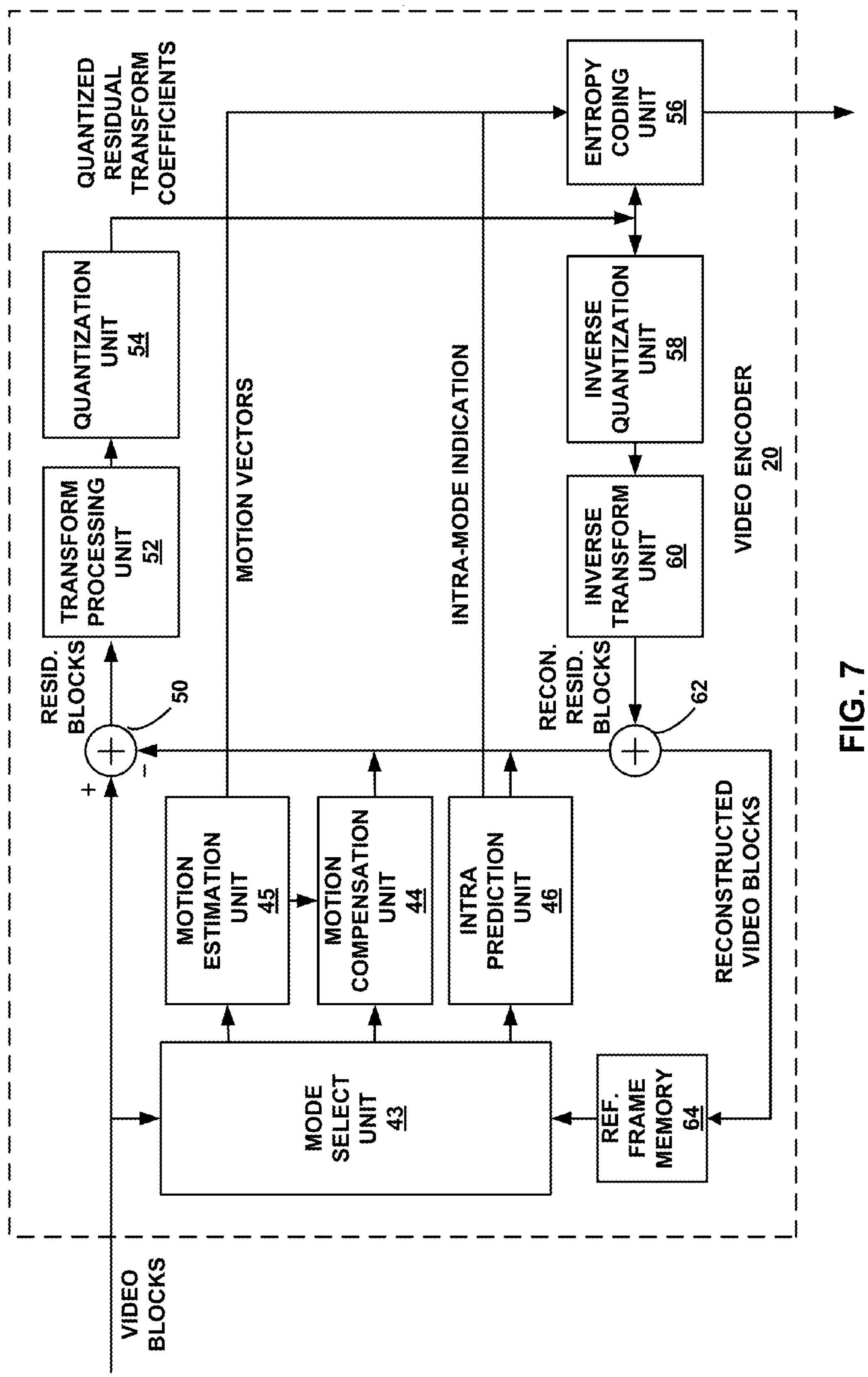
FIG. 7 is a block diagram illustrating an example of a video encoder that may implement techniques where the spatial resolutions of the texture view component and the depth view component are different.

The following discussion of FIGS. 5, 6 and 7 describe some exemplary scenarios where the techniques of this disclosure may be used. For example, FIG. 5 illustrates an example of a video encoder and a video decoder. FIGS. 6 and 7 illustrate an example of a video encoder and a video decoder in greater detail, respectively. The illustrated examples of the video encoder and video decoder may be configured to implement the example techniques described in this disclosure.

For instance, when spatial resolution of the texture view component and the depth view component is different, in some examples, the video encoder may signal the IVMP flag as true for a particular macroblock in the depth view component (e.g., a bit value of one may for the IVMP flag may indicate that the IVMP flag is true); however, the video encoder signaling the IVMP flag is not necessary in every example. When IVMP flag is true, the video encoder may be configured to not signal motion information for the macroblock in the depth view component. The video decoder may be configured to determine the motion information for the macroblock without receiving the motion information. For example, the video decoder determines at least one of the partition mode information, the reference index information, and the motion vector information for the macroblock of the depth view component without receiving the motion information from the video encoder.

In some examples, even when the video encoder signals the IVMP flag as false (e.g., a bit value of zero), the video decoder may be configured to determine the partition mode information for the macroblock in the depth view component. In these examples, the video encoder may signal additional information that indicates the manner in which the video decoder should determine the motion information for the macroblock in the depth view component. For instance, when the IVMP flag is false, the video decoder is able to determine the partition mode information for the macroblock, in some examples, but may require additional information to determine the reference index and the motion vector information. This additional information, which the video encoder signals when IVMP is false as syntax elements, may be explicit signaling of the reference index and the motion vector information, or information indicating where to obtain, predict or adopt the reference index and motion vector information.

FIG. 5 is a block diagram illustrating an example video encoding and decoding system 16 that may utilize the techniques described in this disclosure. As shown in FIG. 5, system 16 includes a source device 18 that generates encoded video data to be decoded at a later time by a destination device 20. Source device 18 and destination device 20 comprise any of a wide range of devices, including a wireless handset such as so-called "smart" phones, so-called "smart" pads, or other such wireless devices equipped for wireless communication. Additional examples of source device 18 and destination device 20 include, but are not limited to, a digital television, a device in digital direct broadcast system, a device in wireless broadcast system, a personal digital assistants (PDA), a laptop computer, a desktop computer, a tablet computer, an e-book reader, a digital camera, a digital recording device, a digital media player, a video gaming device, a video game console, a cellular radio telephone, a satellite radio telephone, a video teleconferencing device, and a video streaming device, or the like.

Destination device 20 may receive the encoded video data to be decoded via a link 22. Link 22 may comprise any type of medium or device capable of moving the encoded video data from source device 18 to destination device 20. In one example, link 22 may comprise a communication medium to enable source device 18 to transmit encoded video data directly to destination device 20 in real-time. The encoded video data may be modulated according to a communication standard, such as a wireless communication protocol, and transmitted to destination device 20. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 18 to destination device 20.

Alternatively, encoded data may be output from output interface 28 to a storage device 39. Similarly, encoded data may be accessed from storage device 39 by input interface. Storage device 39 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 39 may correspond to a file server or another intermediate storage device that may hold the encoded video generated by source device 18. Destination device 20 may access stored video data from storage device 39 via streaming or download. The file server may be any type of server capable of storing encoded video data and transmitting that encoded video data to the destination device 20. Example file servers include a web server (e.g., for a website), an FTP server, network attached storage (NAS) devices, or a local disk drive. Destination device 20 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 39 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 16 may be configured to support one-way or two-way video transmission to support applications such as video streaming, video playback, video broadcasting, and/or video telephony.

In the example of FIG. 5, source device 18 includes a video source 24, video encoder 26 and an output interface 28. In some cases, output interface 28 may include a modulator/demodulator (modem) and/or a transmitter. In source device 18, video source 24 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 24 is a video camera, source device 18 and destination device 20 may form so-called camera phones or video phones. However, the techniques described in this disclosure may be applicable to video coding in general, and may be applied to wireless and/or wired applications.

The captured, pre-captured, or computer-generated video may be encoded by video encoder 26. The encoded video data may be transmitted directly to destination device 20 via output interface 28 of source device 18. The encoded video data may also (or alternatively) be stored onto storage device 39 for later access by destination device 20 or other devices, for decoding and/or playback.

Destination device 20 includes an input interface 34, a video decoder 36, and a display device 38. In some cases, input interface 34 may include a receiver and/or a modem.

Input interface 34 of destination device 20 receives the encoded video data over link 22. The encoded video data communicated over link 22, or provided on storage device 39, may include a variety of syntax elements generated by video encoder 26 for use by a video decoder, such as video decoder 36, in decoding the video data. Such syntax elements may be included with the encoded video data transmitted on a communication medium, stored on a storage medium, or stored a file server.

Display device 38 may be integrated with, or external to, destination device 20. In some examples, destination device 20 may include an integrated display device and also be configured to interface with an external display device. In other examples, destination device 20 may be a display device. In general, display device 28 displays the decoded video data to a user, and may comprise any of a variety of display devices such as a liquid crystal display (LCD), a plasma display, an organic light emitting diode (OLED) display, or another type of display device.

Video encoder 26 and video decoder 36 may operate according to a video compression standard, such as the include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The recent, publicly available joint draft of MVC is described in "Advanced video coding for generic audiovisual services," ITU-T Recommendation H.264, March 2010. A more recent, publicly available joint draft of MVC is described in "Advanced video coding for generic audiovisual services," ITU-T Recommendation H.264, June 2011. A current joint draft of the MVC has been approved as of January 2012. In addition, there is a new video coding standard, namely High Efficiency Video Coding (HEVC) standard presently under development by the Joint Collaboration Team on Video Coding (JCT-VC) of ITU-T Video Coding Experts Group (VCEG) and ISO/IEC Motion Picture Experts Group (MPEG). A recent Working Draft (WD) of HEVC, and referred to as HEVC WD8 hereinafter, is available, as of Jul. 20, 2012, from http://phenix.int-evey.fr/jct/doc_end_user/documents/10_Stockholm/wg11/JCTVC-J1003-v8.zip. For purposes of description, video encoder 26 and video decoder 36 are described in context of the HEVC or the H.264 standard and the extensions of such standards. The techniques of this disclosure, however, are not limited to any particular coding standard. Other examples of video compression standards include MPEG-2 and ITU-T H.263. Proprietary coding techniques, such as those referred to as On2 VP6/VP7/VP8, may also implement one or more of the techniques described herein.

Although not shown in FIG. 5, in some aspects, video encoder 26 and video decoder 36 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 26 and video decoder 36 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 26 and video decoder 36 may be included in one or more encoders or decoders, either of which may be integrated as part of a combined encoder/decoder (CODEC) in a respective device.

A video sequence typically includes a series of video frames. A group of pictures (GOP) generally comprises a series of one or more video frames. A GOP may include syntax data in a header of the GOP, a header of one or more frames of the GOP, or elsewhere, that describes a number of frames included in the GOP. Each frame may include frame syntax data that describes an encoding mode for the respective frame. Video encoder 26 typically operates on video blocks within individual video frames in order to encode the video data. A video block may correspond to a macroblock, a partition of a macroblock, and possibly a sub-block of a partition. The video blocks may have fixed or varying sizes, and may differ in size according to a specified coding standard. Each video frame may include a plurality of slices. Each slice may include a plurality of macroblocks, which may be arranged into partitions, also referred to as sub-blocks.

As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Block sizes that are less than 16 by 16 may be referred to as partitions of a 16 by 16 macroblock. Video blocks may comprise blocks of pixel data in the pixel domain, or blocks of transform coefficients in the transform domain, e.g., following application of a transform such as a discrete cosine transform (DCT), an integer transform, a wavelet transform, or a conceptually similar transform to the residual video block data representing pixel differences between coded video blocks and predictive video blocks. In some cases, a video block may comprise blocks of quantized transform coefficients in the transform domain.

Smaller video blocks can provide better resolution, and may be used for locations of a video frame that include high levels of detail. In general, macroblocks and the various partitions, including further partitions of the partitions, sometimes referred to as sub-blocks, may be considered video blocks. In addition, a slice may be considered to be a plurality of video blocks, such as macroblocks and/or sub-blocks. Each slice may be an independently decodable unit of a video frame. Alternatively, frames themselves may be decodable units, or other portions of a frame may be defined as decodable units. The term "decodable unit" may refer to any independently decodable unit of a video frame such as an entire frame, a slice of a frame, a group of pictures (GOP) also referred to as a sequence, or another independently decodable unit defined according to applicable coding techniques.

When the macroblock is intra-mode encoded (e.g., intra-predicted), the macroblock may include data describing an intra-prediction mode for the macroblock. As another example, when the macroblock is inter-mode encoded (e.g., inter-predicted), the macroblock may include information defining a motion vector for the macroblock. The data defining the motion vector for a macroblock may describe, for example, a horizontal component of the motion vector, a vertical component of the motion vector, a resolution for the motion vector (e.g., one-quarter pixel precision or one-eighth pixel precision). In addition, when inter-predicted, the macroblock may include reference index information such as a reference frame to which the motion vector points, and/or a reference picture list (e.g., RefPicList0 or RefPicList1) for the motion vector.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three directional/angular intra-prediction encoding modes plus DC and Planar modes.

The working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes. Treeblocks may be referred to as LCUs in some examples.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0 or List 1) for the motion vector.

In general, a TU is used for the transform and quantization processes. A given CU having one or more PUs may also include one or more transform units (TUs). Following prediction, video encoder 26 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 26 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In either the H.264 standard or the HEVC standard, following intra-predictive or inter-predictive coding, video encoder 26 may calculate residual data for the TUs of the CU, in HEVC, or for macroblock in H.264. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs in HEVC or prediction values for the macroblock in H.264.

Following any transforms to produce transform coefficients, video encoder 26 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 26 may utilize a predefined scan order to scan the quantized transform coefficients to produce a serialized vector that can be entropy encoded. In other examples, video encoder 26 may perform an adaptive scan. After scanning the quantized transform coefficients to form a one-dimensional vector, video encoder 26 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 26 may also entropy encode syntax elements associated with the encoded video data for use by video decoder 36 in decoding the video data.

To perform CABAC, video encoder 26 may assign a context within a context model to a symbol to be transmitted. The context may relate to, for example, whether neighboring values of the symbol are non-zero or not. To perform CAVLC, video encoder 26 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In the examples described in this disclosure, video encoder 26 may intra- or inter-predict the macroblocks of the texture view components and those of the depth view components, in the manner described above. Video decoder 36 may perform the inverse or reciprocal of the functions performed by video encoder 26 to decode the encoded macroblocks. For example, when a macroblock in a texture view component is inter-coded (e.g., inter-predicted), video encoder 26 signals syntax elements that define the motion information for that macroblock such as the partition mode information, the reference index information, and the motion vector information. Video decoder 36 receives the motion information syntax elements for the macroblock and decodes the macroblock to reconstruct the original texture view component based on the received motion information. Video encoder 26 and video decoder 36 perform similar functions for the macroblocks of the depth view components as well.

However, for some situations, video encoder 26 may not need to signal syntax elements that define the motion information for a macroblock of the depth view component. Rather, for some macroblocks of the depth view component, video encoder 26 may signal the IVMP flag, as described above; however, the signaling of the IVMP flag is not needed in every example. When the IVMP flag is not signaled, video decoder 36 determines the status of the IVMP flag based on the status of previously decoded blocks, and without needing to receive the IVMP flag.

When the IVMP flag is true for a macroblock in the depth view component, video decoder 36 uses the motion information from one of the corresponding macroblocks of the texture view component to decode the macroblock in the depth view component. Again, in the examples described in this disclosure, the spatial resolution of the texture view component and the depth view component may be different such that a plurality of macroblocks in the texture view component corresponds to one macroblock in the depth view component.

As used in this disclosure, the term "corresponds" or "corresponding" may be used interchangeably with the terms "associated" or "co-located." For example, as described above, the depth view component indicates relative depths of the pixels in its corresponding texture view component. In this way, the depth view component and its corresponding texture view component are considered as being associated with one another. Therefore, a plurality of macroblocks in the texture view component (i.e., texture view macroblocks) may be considered as being associated with a depth view macroblock. Also, one of the texture view macroblocks and its corresponding depth view macroblock may be located in the same location in respective components. For example, a texture view macroblock located in the top-left corner of the texture view component corresponds to a depth view macroblock located in the top-left corner of the depth view component. In this way, the texture view macroblock and its corresponding depth view macroblock are considered as being co-located.

In accordance with the techniques described in this disclosure, when video decoder 36 determines that IVMP is enabled (e.g., by receiving the IVMP flag or determining the status of the IVMP flag without receiving the status of the IVMP flag), video decoder 36 determines how to use the motion information from one of the texture view macroblocks that corresponds to the depth view macroblock. Also, even if video decoder 36 determines that IVMP is disabled for a depth view macroblock, video decoder 36 may still be able to determine some motion information for the depth view macroblock.

For purposes of illustration only, the techniques are first described with examples where spatial resolution of the depth view component is a quarter of the spatial resolution of the texture view component. For these cases, there are various possible techniques which are each described in turn. Next, the techniques are described with examples where spatial resolution of the depth view component is a half of the spatial resolution of the texture view component. Similarly, for these cases, there are various possible techniques which are each described in turn.

In examples where the spatial resolution of the depth view component is a quarter of that of the texture view component, the width of the depth view component is a half of the width of the texture view component, and the height of the depth view component is a half of the height of the texture view component. The examples of the motion information that video decoder 36 determines for the depth view macroblock include partition mode information, reference index information, and motion vector information.

As one example, if any of the corresponding macroblocks in the texture view component is intra-predicted, then IVMP may be disabled. For example, referring back to FIG. 4A, texture view macroblocks 2A-2D correspond to depth view macroblock 4. In this example, if any one of texture view macroblocks 2A-2D is intra-predicted, then video encoder 26 may signal the IVMP flag as false (e.g., as a zero) to indicate that IVMP is disabled for depth view macroblock 4. Alternatively, video decoder 36 may have previously decoded texture view macroblock 2A-2D, and may determine that IVMP is disabled for depth view macroblock 4 without needing to receive the IVMP flag from video encoder 26. In either case, video decoder 36 may not be able to use the motion information for any one of texture view macroblocks 2A-2B for decoding depth view macroblock 4. Rather, video encoder 26 may signal additional information to video decoder 36 that indicates to video decoder 36 the information needed to decode depth view macroblock 4.

As another example, if any of the corresponding macroblocks in the texture view component has a macroblock partition mode equal to "four 8×8 MB partition," then IVMP may be disabled. For example, referring back to FIG. 4B, texture view macroblock 6 is partitioned into four 8×8 texture view partitions 8A-8D. In this case, video encoder 26 may signal the IVMP flag as false to indicate that IVMP is disabled for depth view macroblock 10. Alternatively, because video decoder 36 may have already decoded texture view macroblock 6 before decoding depth view macroblock 10, video decoder 36 may determine that IVMP is disabled for depth view macroblock 10 without needing to receive the IVMP flag.

Also, in FIG. 4A, if any one of texture view macroblocks 2A-2D are partitioned into four 8×8 MB partitions, then video encoder 26 may signal the IVMP flag as false to indicate that IVMP is disabled for depth view macroblock 4. Again, it is possible for video decoder 36 to determine that IVMP is disabled for depth view macroblock 4 without explicitly receiving the IVMP flag from video encoder 26. In this example, for both depth view macroblock 4 and depth view macroblock 10, video encoder 26 may signal additional information that video decoder 36 receives to determine the manner in which to decode the encoded depth view macroblock 4 and depth view macroblock 10.

As described above, in some examples, when IVMP is disabled, it is not necessary for video encoder 26 to explicitly signal that IVMP is false for a depth view macroblock. For example, when video decoder 36 is decoding texture view macroblocks 2A-2D, in some cases, video decoder 36 determines that at least one of texture view macroblocks 2A-2D is intra-predicted. In this case, video decoder 36 determines that IVMP is disabled for depth view macroblock 4 without needing to receive the IVMP flag from video encoder 26. Similarly, when decoding texture view macroblock 6, video decoder 36 determines that texture view macroblock is partitioned into four 8×8 texture view partitions 8A-8D. In this case, video decoder 36 determines that IVMP is disabled (e.g., the IVMP flag is false) for depth view macroblock 10 without needing to receive the IVMP flag from video encoder 26. In this manner, video encoder 26 does not need to signal the IVMP flag in every example thereby further promoting bandwidth efficiency.

When the macroblock partition for a texture view macroblock is "four 8×8 MB partition," or when at least one of the corresponding macroblocks in the texture view component is intra-predicted, even though the IVMP is disabled, it is still possible for video decoder 36 to determine the partition mode for the corresponding depth view macroblock. For example, when a macroblock partition for a texture view macroblock is "four 8×8 MB partition," video decoder 36 is configured to set the macroblock partition for the corresponding depth view macroblock to "four 8×8 MB partition." Similarly, if any one of the corresponding macroblocks in the texture view component is intra-predicted, video decoder 36 is configured to set the macroblock partition for the corresponding depth view macroblock to "four 8×8 MB partition." For instance, referring back to FIG. 4B, video decoder 36 sets the macroblock partition for depth view macroblock 10 as "four 8×8 MB partitions" (e.g., depth view partitions 12A-12D).

Furthermore, because video decoder 36 sets the macroblock partition for depth view macroblock 10 as "four 8×8 MB partitions," during encoding, video encoder 26 may also set the macroblock partition for depth view macroblock 10 as "four 8×8 MB partitions." In this manner, video encoder 26 may be configured to set the macroblock partition for depth view macroblock 10 as "four 8×8 MB partitions," and, for this example, may be configured to signal additional information that video decoder 36 uses to determine the motion information for decoding depth view macroblock 10.

When the depth view component is a quarter of the resolution of its corresponding texture view component, one 8×8 macroblock partition in the depth view component corresponds to one 16×16 macroblock in the texture view component, two 16×8 macroblock partitions of a macroblock in the texture view component, or two 8×16 macroblock partitions of a macroblock in the texture view component. Accordingly, the following examples are described for the 8×8 macroblock partition in the depth view component.

Again, as described above, if any of the 16×16 texture view macroblocks for a corresponding 16×16 depth view macroblock is partitioned into four 8×8 macroblock partitions or coded as an intra-predicted mode, then IMVP is disabled. If all of the corresponding 16×16 texture view macroblocks are partitioned as one 16×16 macroblock partition, two 16×8 macroblock partitions, or two 8×16 macroblock partitions, then IVMP is enabled in some cases, but may be disabled in some other cases, as described below.

In addition, if the picture with the same Picture Order Count (POC) of the reference picture used for the corresponding macroblocks in the texture view component is not included in the reference picture list for the depth view component, IVMP may be disabled. For example, video encoder 26 and video decoder 36 may each construct reference picture lists (e.g., RefPicList0 and/or RefPicList1) for the texture view component and the depth view component. If a reference depth view component, which corresponds to the reference texture view component, is not in the constructed reference picture lists for the depth view component, then IVMP may be disabled. In this example, the reference texture view component is used to inter-predict the corresponding block of the corresponding texture view component.

For example, when an 8×8 depth view macroblock partition corresponds to one 16×16 texture view macroblock partition (such as mb_type equal to P_Skip, B_Skip, B_Direct 16×16, P_L0_16×16, B_L0_16×16, B_L1_16×16 or B_Bi_16×16), IVMP may be enabled. In this case, video decoder 36 may set the reference index or indices for the 8×8 depth view macroblock partition to the reference index or indices of the one 16×6 texture view macroblock partition. Also, in this case, video decoder 36 may set the partition for the 8×8 depth view macroblock partition to "one 8×8 sub-block."

For instance, video encoder 26 may have inter-predicted the one 16×6 texture view macroblock partition with one reference texture view component (i.e., uni-directionally predicted) or with two reference texture view components (i.e., bi-predicted). Video decoder 36 may be configured to construct the reference picture lists (i.e., RefPicList0 and RefPicList1) that identify the reference texture view components that are used to inter-predict the one 16×16 texture view macroblock partition. The reference texture view components may be identified with their respective picture order count (POC) values that indicate a display or output order of the texture view components. In this example, if uni-directionally predicted, video encoder 26 may have signaled the reference index into one of RefPicList0 or RefPicList1 that identifies the reference texture view component (e.g., by its POC value) that video encoder 26 used to inter-predict the one 16×16 texture view macroblock. If bi-predicted, video encoder 26 may have signaled the reference indices into each one of RefPicList0 and RefPicList1 that identifies the reference texture view components (e.g., by their POC values) that video encoder 26 used to inter-predict the one 16×16 texture view macroblock.

Similar to the texture view component, for the 8×8 depth view macroblock partition, video decoder 36 may be configured to construct the reference picture lists that identify the reference texture view components that are used to inter-predict the 8×8 depth view macroblock partition. To avoid confusion, the reference picture lists that identify reference texture view components are referred to as texture view RefPicList0 and texture view RefPicList1, and the reference picture lists that identify reference depth view components are referred to as a depth view RefPicList0 and depth view RefPicList1.

In this example, where the 8×8 depth view macroblock partition corresponds to the one 16×16 texture view macroblock partition, the texture view components identified in texture view RefPicList0 and texture view RefPicList1 correspond to the depth view components identified in depth view RefPicList0 and depth view RefPicList1. For example, the first reference texture view component identified in texture view RefPicList0 corresponds to the first reference depth view component identified in depth view RefPicList0, and so forth.

The depth view components may also be identified by their respective POC values. In some examples, the POC value for a texture view component may be the same POC value as the POC value for depth view component that corresponds the texture view component. For example, if the POC value for a texture view component is 5, then the POC value for its corresponding depth view component will also be 5. However, aspects of this disclosure are not so limited.

In some cases, the order of reference pictures in texture view RefPicList0 and texture view RefPicList1 and depth view RefPicList0 and depth view RefPicList1 may be different. In this case, the reference picture used for depth view components may have the same POC value with that of the texture view components although the reference picture indices in depth view RefPicList0 and depth view RefPicList1 may be different from that of the texture view components in texture view RefPicList0 and texture view RefPicList1, respectively.

In this example, video decoder 36 determines the POC value or values of the reference texture view component(s) in the texture view RefPicList0 and/or texture view RefPicList1. If the ordering of the reference pictures in texture view RefPicList0 and texture view RefPicList1 and depth view RefPicList0 and depth view RefPicList1 is different, video decoder 36 determines the reference index in depth view RefPicList0 and/or depth view RefPicList1 which identifies the reference depth view component(s) with the same POC value(s) as the reference texture view component(s). Video decoder 36 then utilizes the determined reference index in depth view RefPicList0 and RefPicList1 for identifying the reference depth view component(s) that are used to inter-predict the 8×8 depth view macroblock partition.

In the following description, it is assumed that POC of each reference picture in reference picture lists for depth view components is equal to that for texture view components (e.g., the ordering of the POC values in the texture view RefPicList0 and/or RefPicList1 is the same as the ordering of the POC values in the depth view RefPicList0 and/or RefPicList1). It should be understood that, in the following examples, it is possible for the ordering of the POC values in the texture view RefPicList0 and/or RefPicList1 to be different than the ordering of the POC values in the depth view RefPicList0 and/or RefPicList1. In such cases, video decoder 36 determines the reference index into depth view RefPicList0 and/or RefPicList1 in the manner described above. Also, as noted above, if there is a POC value in the texture view RefPicList0 and/or RefPicList1 that is not included in the depth view RefPicList0 and/or RefPicList1 (regardless of the ordering), then IVMP may be disabled for that depth view macroblock.

In some examples, if video encoder 26 inter-predicted the one 16×6 texture view macroblock partition from the "nth" reference texture view component identified in texture view RefPicList0, then to decode the 8×8 depth view macroblock partition, video decoder 36 may utilizing the "nth" reference depth view component identified in depth view RefPicList0 (assuming the ordering is the same). The same would apply if video encoder 26 inter-predicted the one 16×16 texture view macroblock partition from two reference texture view components identified in each one of texture view RefPicList0 and texture view RefPicList1.

However, if the ordering of the pictures is not the same, video decoder 36 determines the reference index of the depth view picture lists based on the reference index of the texture view picture lists. For example, if the ordering of the pictures is not the same in the depth view reference picture lists and the texture view reference picture lists, then, if video encoder 26 inter-predicted the one 16×16 texture view macroblock partition from the "nth" reference texture view component identified in texture view RefPicList0, then video decoder 36 determines the POC value of the "nth" reference texture view component in texture view RefPicList0. Video decoder 36 then determines the reference index in depth view RefPicList0 that identifies a depth view reference component whose POC value is the same as the POC value of the "nth" reference texture view component. In this example, to decode the 8×8 depth view macroblock partition, video decoder 36 utilizes the determined reference index in depth view RefPicList0. The same would apply with respect to texture view RefPicList1 and depth view RefPicList1.

For example, video decoder 36 may determine that an order in which the POC values are listed in a texture view reference picture list (e.g., texture view RefPicList0 and/or texture view RefPicList1) is different than an order in which POC values are listed in a depth view reference picture list (e.g., depth view RefPicList0 and/or RefPicList1). In this case, to determine the reference index information for an 8×8 depth view macroblock partition, video decoder 36 determines a POC value of a reference texture view component identified in the texture view reference picture list based on a reference index for the 16×16 texture view macroblock. Video decoder 36 determines a reference index of the depth view reference picture list, where the reference index of the depth view reference picture list identifies a POC value in the depth view reference picture list that is equal to the POC value of the reference texture view component.

In this manner, video decoder 36 may use the reference index information for the one 16×16 texture view macroblock partition for determining the reference index information for the 8×8 depth view macroblock partition. For example, video decoder 36 may set the reference index information for the 8×8 depth view macroblock partition equal to the reference index information for the one 16×16 texture view macroblock partition, when the ordering of the POC values in the texture view component and depth view components is the same. In this case, the reference index information for the one 16×16 texture view macroblock partition refers to one or both of texture view RefPicList0 and texture view RefPicList1. Video decoder 36 may use the reference index or indices for the one 16×16 texture view macroblock partition as the reference index or indices into the one or both of depth view RefPicList0 and depth view RefPicList1 to decode the 8×8 depth view macroblock partition. In this example, video encoder 26 may encode the one 16×16 texture view macroblock partition and the 8×8 depth view macroblock partition using the same reference index or indices for the texture view RefPicList0, texture view RefPicList1, depth view RefPicList0, and depth view RefPicList1 constructed at the video encoder 26 side.

In the example where the ordering of the POC values is not the same in the texture view RefPicList0 and/or RefPicList1 and the depth view RefPicList0 and/or RefPicList1, video decoder 36 may determine the reference index into depth view RefPicList0 and/or RefPicList1 in the manner described above. Video decoder 36 may use the determined reference index or indices for the one or both of depth view RefPicList0 and depth view RefPicList1 to decode the 8×8 depth view macroblock partition.

Also, video encoder 26 and video decoder 36 may determine the sub-block partition for the 8×8 depth view macroblock partition when the 8×8 depth view macroblock partition corresponds to one 16×16 texture view macroblock partition. For example, video encoder 26 and video decoder 36 may set the sub-block partition of the 8×8 depth view macroblock partition to "one 8×8 sub-block," which means that the 8×8 depth view macroblock partition should not be further partitioned.

The above examples described the situation where the 8×8 depth view macroblock partition corresponds to one 16×16 texture view macroblock partition. The following describes techniques implemented by video encoder 26 and video decoder 36 where the 8×8 depth view macroblock partition corresponds to two 16×8 texture view macroblock partitions or two 8×16 texture view macroblock partitions.

In the following examples where the texture view macroblock is partitioned into two 16×8 texture macroblock partitions or two 8×16 texture view macroblock partitions, the techniques are described with examples where each of the two 16×8 texture macroblock partitions or two 8×16 texture view macroblock partitions are inter-predicted in one direction (e.g., a P-picture or P-slice that is inter-predicted with respect to a picture identified in RefPicList0 or a picture identified in RefPicList1). In examples where the two 16×8 texture macroblock partitions or two 8×16 texture view macroblock partitions are inter-predicted in both directions (e.g., a B-picture or B-slice that is inter-predicted with respect to a picture identified in RefPicList0 and a picture identified in RefPicList1), video encoder 26 and video decoder 36 may implement substantially similar techniques as those described below with respect to examples in which the two 16×8 texture macroblock partitions or two 8×16 texture view macroblock partitions are inter-predicted with respect to a picture in either RefPicList0 or RefPicList1 (i.e., inter-predicted in one direction).

In some of these examples, video encoder 26 and video decoder 36 are configured to determine the partition mode for the 8×8 depth view macroblock partition to be "one 8×8 sub-block" (e.g., no further partition of the 8×8 depth view macroblock partition). However, aspects of this disclosure are not so limited, and in some instances, video encoder 26 and video decoder 36 determine the partition mode for the 8×8 depth view macroblock to be different than "one 8×8 sub-block." In this manner, when IVMP is enabled, video decoder 36 is configured to determine the partition mode for the 8×8 depth view macroblock partition without needing to receive information that indicates the partition mode of the 8×8 depth view macroblock partitions. Also, in this manner, when IVMP is enabled, video encoder 26 does not need to signal information that indicates the partition mode of the 8×8 depth view macroblock partitions.

Furthermore, in the following examples, the reference index or indices for the two texture view macroblock partitions is different and both of them unequal to −1. For example, the reference index or indices, which identify the reference texture view component or components for each of the two 16×8 texture view macroblock partitions or each of the two 8×16 texture view macroblock partitions, are different. In other words, if a texture view macroblock is partitioned into two 16×8 or 8×16 texture view macroblock partitions, then each of the texture view macroblock partitions is inter-predicted with respect to different reference texture view component or components when the reference index or indices for each of the two 16×8 or two 8×16 texture view macroblock partitions is different. The situation where the reference index or indices for each of the two 16×8 or two 8×16 texture view macroblock partitions is the same as described in more detail after the following examples.

As one example, when the 8×8 depth view macroblock partition corresponds to two 16×8 texture view macroblock partitions or two 8×16 texture view macroblock partitions, the reference index and motion vector may only be predicted from one of the two texture view macroblock partitions (i.e., one of the two 16×8 texture view macroblock partitions or one of the two 8×16). For instance, in this case, there are at least two possible reference index and motion vector information: one from the first one of the 16×8 or 8×16 texture view macroblock partitions, and one from the second one of the 16×8 or 8×16 texture view macroblock partitions. Video decoder 36 is configured to select the reference index and motion vector information for at least one of the two 16×8 or 8×16 texture view macroblock partitions as the reference index and the motion vector information for the 8×8 depth view macroblock partition.

In some examples, video decoder 36 selects one of the 16×8 or 8×16 texture view macroblock partition based on the location of the 8×8 depth view macroblock partition within the 16×16 depth view macroblock and the locations of the two 16×8 or 8×16 texture view macroblock partitions within the 16×16 texture view macroblock. For example, video decoder 36 selects the texture view macroblock partition that encompasses a same area within the texture view macroblock that the 8×8 depth view macroblock partition encompasses within the depth view macroblock. Video decoder 36 uses the reference index and the motion vector information of the selected one of the 16×8 or 8×16 texture view macroblock partition to determine the reference index and motion vector information of the 8×8 depth view macroblock partition that corresponds to the 16×16 texture view macroblock that includes the two 16×8 or 8×16 texture view macroblock partitions. This technique is further illustrated in FIG. 6.

FIG. 6 is conceptual diagram of texture view blocks and depth view blocks for determining reference index and motion vector information for a depth view partition. FIG. 6 illustrates texture view macroblock 39 which is partitioned into two 8×16 texture view macroblock partitions (i.e., texture view partition 40A and texture view partition 40B). It should be understood that the techniques described with respect to FIG. 6 are equally applicable to examples where texture view macroblock 39 is partitioned into two 16×8 texture view macroblock partitions. FIG. 6 also illustrates depth view macroblock 41 which is partitioned into four 8×8 depth view macroblock partitions (i.e., depth view partition 42A-42D).

Each one of texture view partition 40A and 40B may have its own independent motion information. For example, the reference index or indices for texture view partition 40A is different than the reference index or indices for texture view partition 40B. Also, the motion vector for texture view partition 40A is different than the motion vector for texture view partition 40B.

In the example of FIG. 6, if IVMP is enabled for depth view macroblock 41, then video decoder 36 is able to determine the reference index and the motion vector information for each one of depth view partitions 42A-42D. As above, assume that the spatial resolution of depth view component is a quarter of the spatial resolution of the texture view component. In this example, each of the 8×8 depth view partitions 42A-42D corresponds to one 16×16 texture view macroblock.

For example, assume that the 8×8 depth view macroblock partition 42A corresponds to the 16×16 texture view macroblock 39. In this example, video decoder 36 determines that the 8×8 depth view macroblock partition 42A encompasses the top-left corner of the 16×16 depth view macroblock 41. Video decoder 36 also determines that the 8×16 texture view macroblock partition 40A encompasses the top-left corner of the 16×16 texture view macroblock 39. Therefore, in this example, to determine the reference index and motion vector information for the 8×8 depth view macroblock partition 42A, video decoder 36 selects the 8×16 texture view macroblock partition 40A because the 8×16 texture view macroblock partition 40A encompasses a same area within texture view macroblock 39 that the 8×8 depth view macroblock partition 42A encompasses within depth view macroblock 41.

In other words, video decoder 36 determines which one of the two texture view block partitions (e.g., 8×16 texture view macroblock partition 40A or 8×16 texture view macroblock partition 40B) encompasses at least a same area relative to the texture view block (e.g., texture view macroblock 39) of where at least one partition (e.g., 8×8 depth view macroblock partition 42A) of the depth view block (e.g., depth view macroblock 41) is located relative to the depth view block. In techniques described in this disclosure, texture view block partition that encompasses at least a same area relative to the texture view block of where at least one partition of the depth view block is located relative to the depth view block may be considered as the texture view block partition that is closer to the center of the texture view block.

For instance, 8×16 texture view macroblock 40A encompasses at least the same area relative to texture view macroblock 39 of where 8×8 depth view partition 42A is located relative to 16×16 depth view macroblock 41. In this case, video decoder 36 selects the 8×16 texture view macroblock partition 40A as the partition whose motion information is used to determine the motion information for the 8×8 depth view macroblock partition 42A.

In this example, video decoder 36 may determine that the reference index into depth view RefPicList0 and/or depth view RefPicList1 for the 8×8 depth view macroblock partition 42A is the same as the reference index into texture view RefPicList0 and/or texture view RefPicList1 for the 8×16 texture view macroblock partition 40A. Video decoder 36 may perform scaling, as described below, on the motion vector(s) of the 8×16 texture view macroblock partition 40A to determine the motion vector(s) of the 8×8 depth view macroblock partition 42A. In this manner, video decoder 36 may be able to determine the reference index and motion vector information for the 8×8 depth view macroblock partition 42A without needing to receive, in the coded bitstream signaled by video encoder 26, the reference index and motion vector information for the 8×8 depth view macroblock partition 42A.

As another example, assume that the 8×8 depth view macroblock partition 42B corresponds to the 16×16 texture view macroblock 39. In this example, video decoder 36 determines that the 8×8 depth view macroblock partition 42B encompasses the top-right corner of the 16×16 depth view macroblock 41. Video decoder 36 also determines that the 8×16 texture view macroblock partition 40B encompasses the top-right corner of the 16×16 texture view macroblock 39. For instance, the 8×16 texture view macroblock partition 42B encompasses a same area relative to texture view macroblock 39 of where the 8×8 depth view macroblock partition 42B is located relative to 16×16 depth view macroblock 41.

Therefore, in this example, to determine the reference index and motion vector information for the 8×8 depth view macroblock partition 42B, video decoder 36 selects the 8×16 texture view macroblock partition 40B because the 8×16 texture view macroblock partition 40B encompasses a same area within texture view macroblock 39 that the 8×8 depth view macroblock partition 42B encompasses within depth view macroblock 41. In this example, video decoder 36 similarly determines reference index and motion vector information for the 8×8 depth view macroblock partition 42B as described in the above example with respect to the 8×8 depth view macroblock partition 42A.

As another example, assume that the 8×8 depth view macroblock partition 42C corresponds to the 16×16 texture view macroblock 39. In this example, video decoder 36 determines that the 8×8 depth view macroblock partition 42C encompasses the bottom-left corner of the 16×16 depth view macroblock 41. Video decoder 36 also determines that the 8×16 texture view macroblock partition 40A encompasses the bottom-left corner of the 16×16 texture view macroblock 39. Therefore, in this example, to determine the reference index and motion vector information for the 8×8 depth view macroblock partition 42C, video decoder 36 selects the 8×16 texture view macroblock partition 40A because the 8×16 texture view macroblock partition 40A encompasses a same area within texture view macroblock 39 that the 8×8 depth view macroblock partition 42C encompasses within depth view macroblock 41. In this example, video decoder 36 similarly determines reference index and motion vector information for the 8×8 depth view macroblock partition 42C as described in the above example with respect to the 8×8 depth view macroblock partition 42A.

As another example, assume that the 8×8 depth view macroblock partition 42D corresponds to the 16×16 texture view macroblock 39. In this example, video decoder 36 determines that the 8×8 depth view macroblock partition 42D encompasses the bottom-right corner of the 16×16 depth view macroblock 41. Video decoder 36 also determines that the 8×16 texture view macroblock partition 40B encompasses the bottom-right corner of the 16×16 texture view macroblock 39. Therefore, in this example, to determine the reference index and motion vector information for the 8×8 depth view macroblock partition 42D, video decoder 36 selects the 8×16 texture view macroblock partition 40B because the 8×16 texture view macroblock partition 40B encompasses a same area within texture view macroblock 39 that the 8×8 depth view macroblock partition 42D encompasses within depth view macroblock 41. In this example, video decoder 36 similarly determines reference index and motion vector information for the 8×8 depth view macroblock partition 42D as described in the above example with respect to the 8×8 depth view macroblock partition 42A.

In the above examples, video decoder 36 selected the texture view macroblock partition that encompasses a same area in the texture view macroblock that the depth view macroblock partition encompasses in the depth view macroblock. However, aspects of this disclosure are not so limited. In some examples, video decoder 36 selects the one of the 16×8 or 8×16 texture view macroblock partition that is closer to the center of the texture view component as the texture view macroblock partition from which the motion information of the 8×8 depth view macroblock partition is determined. Alternatively, the one of the 16×8 or 8×16 texture view macroblock partition with a smaller reference index or indices is selected as the texture view macroblock partition from which the motion information of the 8×8 depth view macroblock is determined. Alternatively, IVMP is set to false (i.e., disabled) for this depth macroblock.

In the above example of video decoder 36 determining the motion information for a depth view macroblock partition when its corresponding texture view macroblock is partitioned as two 16×8 or 8×16 texture view macroblock partitions, it is assumed that the reference index or indices for the two 16×8 or 8×16 texture view macroblock partitions is different and unequal to −1. In this example, as described above video decoder 36 selects one of the two 16×8 or 8×16 texture view macroblock partitions and use the motion information to determine the motion information for the 8×8 depth view macroblock partition that corresponds to the texture view macroblock that is partitioned into the two 16×8 or 8×16 texture view macroblock partitions.

As an example, assume that video decoder 36 selected the first 8×16 texture view macroblock partition of the two 8×16 texture view macroblock partitions within a texture view macroblock. In this example, video decoder 36 uses the reference index or indices that are used to identify the reference texture view component or components of the first 8×16 texture view macroblock as the reference index or indices to identify the reference depth view component that is used to decode the 8×8 depth view macroblock partition. Similarly, in this example, video encoder 26 uses the reference index or indices that are used to identify the reference texture view component or components of the first 8×16 texture view macroblock as the reference index or indices to identify the reference depth view component that is used to encode the 8×8 depth view macroblock partition.

In these examples, video decoder 36 and video encoder 26 also use the motion vector information of the first 8×16 texture view macroblock partition for decoding or encoding, respectively, the 8×8 depth view macroblock partition. For example, in addition to identifying the reference texture view component that is used to inter-predict the two 8×16 or two 16×8 texture view macroblock partitions, video encoder 26 also identifies a motion vector for each of the two 8×16 or two 16×8 texture view macroblock partitions. In this example, video decoder 36 determines the motion vector for the first 8×16 texture view macroblock partition, and determines the motion vector for the 8×8 depth view macroblock partition based on the determined motion vector for the first 8×16 texture view macroblock partition.

For example, video decoder 36 may need to perform additional scaling of the motion vector of the determined motion vector for the first 8×16 texture view macroblock partition because the spatial difference in the texture view component and the depth view component. Such scaling is described in more detail below.

In some alternate examples, rather than using reference index or indices and the motion vector for the 8×16 or 16×8 texture view macroblock partition that encompass a same area as the 8×8 depth view macroblock partition, video decoder 36 uses the reference index or indices and the motion vector for the texture view macroblock partition with the smaller reference index or indices. For example, if the reference index for the first 8×16 texture view macroblock partition is less than the reference index for the second 8×16 texture view macroblock partition, video decoder 36 uses the reference index and the motion vector for the first 8×16 texture view macroblock partition for inter-predicting the 8×8 depth view macroblock partition. The opposite would occur if the reference index for the second 8×16 texture view macroblock partition is less the reference index for the first 8×16 texture view macroblock partition. The same techniques would apply to the case where the texture view macroblock is partitioned into two 16×8 texture view macroblock partitions.

The preceding examples described some example implementations for when the reference index or indices for the two 8×16 and 16×8 texture view macroblock partitions is different for determining the manner in which the 8×8 depth view macroblock partition is inter-predicted. However, there may be other implementations for when the reference index or indices for the two 8×16 and 16×8 texture view macroblock partitions is different. For example, rather than using any of the reference index or indices information or using any of the motion vector information, video encoder 26 may signal the IVMP flag as false (i.e., IVMP is disabled). As described above, when IVMP is disabled, video decoder 36 may not use motion information, and may instead receive syntax elements that define the motion information that is to be used by video decoder 36 for inter-predicting (e.g., decoding) the 8×8 depth view macroblock partition.

As another example, video encoder 26 and video decoder 36 may determine a mapping factor for the motion vectors for the two 8×16 or two 16×8 texture view macroblock partitions. The mapping factor may be based on the picture order count (POC) value of the reference texture view components used for inter-prediction. The POC value is a numerical value that indicates the display or output order of the texture view components. For example, a texture view component with a lower POC value is displayed or outputted earlier than a texture view component with a higher POC value.

For instance, assume that the one of the two 8×16 or two 16×8 texture view macroblock partitions is inter-predicted with reference texture view component referred to as RefA, and that the other of the two 8×16 or two 16×8 texture view macroblock partitions is inter-predicted with reference texture view component referred to as RefB. The reference index for RefA in RefPicList0 or RefPicList1 may be ref_idxA, and the reference index of RefB in RefPicList0 or RefPicList1 may be ref_idxB. In this example, video encoder 26 may signal the values of ref_idxA and ref_idxB and indicate whether ref_idxA and ref_idxB refer to RefPicList0 or RefPicList1. Video decoder 30 may then determine the POC value for RefA and RefB by indexing into RefPicList0 or RefPicList1 based on the ref_idxA and ref_idxB index values.

Video encoder 26 and video decoder 36 may implement the following equation to determine the mapping factor:

$$\text{mapping factor}=(\text{POC(RefB)}-\text{POC(CurrP)})/(\text{POC(RefA)}-(\text{POC(CurrP)}).$$

In the above equation, CurrP refers to the current texture view component, POC(CurrP) refers to the POC value of the current texture view component, POC(RefB) refers to the POC value of RefB, and POC(RefA) refers to the POC value of RefA.

In this example implementation, the value of ref_idxA is greater than the value of ref_idxB. In other words, RefA may be the reference texture view component for the one of the two 8×16 or two 16×8 texture view macroblock partitions that has the greater reference index value, and RefB may be the reference texture view component for the other of the two 8×16 or two 16×8 texture view macroblock partitions that has the lesser reference index value.

With the mapping factor, video encoder 26 and video decoder 36 may map one motion vector with the larger reference index to a motion vector with a smaller reference index. For example, video encoder 26 and video decoder 36 may multiply the mapping factor with the x and y components of the motion vector for the one of the two 8×16 or two 16×8 texture view macroblock partition with the greater reference index value. Video encoder 26 and video decoder 36 may then use the resulting mapped motion vector value for determining the motion vector for the 8×8 depth view macroblock partition. For instance, in some examples, video encoder 26 and video decoder 36 may need to further scale the mapped motion vector value because the spatial resolutions of the texture view component and the depth view component are different, as described in more detail below.

In this manner, video encoder 26 and video decoder 36 may determine the motion vector for the 8×8 depth view macroblock partition, in this example implementation. Video encoder 26 and video decoder 36 may determine the reference index for the 8×8 depth view macroblock partition may multiplying the mapping factor with the larger reference index value. In this manner, video encoder 26 and video decoder 36 may determine the reference index for the 8×8 depth view macroblock partition, in this example implementation. In this example implementation, video encoder 26 and video decoder 36 may determine that the sub-block partition for the 8×8 depth view macroblock partition as "two 8×4 sub-blocks" or "two 4×8 sub-blocks" based on whether the texture view macroblock partitions are 16×8 or 8×16 texture view macroblock partitions, respectively.

In some instances, if the reference texture view components for one of the two 8×16 or two 16×8 texture view macroblock partitions is an inter-view texture view component (e.g., a texture view component that is not in the same view as the current texture view component), then video encoder 26 and video decoder 36 may not implement the mapping techniques described above. Rather, video encoder 26 and video decoder 36 may implement the techniques described where video decoder 36 uses motion information for the 8×16 or 16×8 texture view macroblock partition, which encompasses the same area in the texture view macroblock that the 8×8 depth view macroblock partition encompasses in the depth view macroblock, as the motion information for the 8×8 depth view macroblock partition.

In some of the above examples, the texture view macroblock was partitioned into two 8×16 or two 16×8 texture view macroblock partitions, and each of the two 8×16 or two 16×8 texture view macroblock partitions were inter-predicted with different reference texture view components (i.e., the reference index for each partition was different). In some examples, it may be possible that both reference indices of some reference picture list is −1 (e.g., for reference picture list X (X equal to 0 or 1), the reference index for one of the two 8×16 or two 16×8 texture view macroblock partitions, and the reference index for the other of the two 8×16 or two 16×8 texture view macroblock partitions is −1). When both of the reference indices are −1, video encoder 26 and video decoder 36 may determine that the 8×8 depth view macroblock partition is not predicted from RefPicListX, but rather from some other reference texture view components (e.g., RefPicList(1−X)). In other words, video encoder 26 and video decoder 36 may determine that 8×8 depth view macroblock is predicted from the reference picture list whose index value is not equal to −1.

In this case, video encoder 26 and video decoder 36 may derive the motion vector information and reference picture index in reference picture list (1−X) for one of the two 8×16 or two 16×8 texture view macroblock partitions to determine the motion vector information for the 8×8 depth view macroblock partition. For example, assume that the 16×16 texture view macroblock is partitioned into a first 16×8 texture view macroblock partition, and a second 16×8 texture view macroblock partition.

If both reference indices in the texture view reference picture list X (X being 0 or 1) is −1 (meaning that the first and second 16×8 texture view macroblock partitions are not predicted from the direction corresponding to reference picture list X), video encoder 26 and video decoder 36 may set the reference index of the corresponding 8×8 depth view macroblock partition in depth view reference picture list X equal to −1. For instance, if the reference index for the texture view RefPicList0 for both the first and second 16×8 texture view macroblock partitions is −1, then video encoder 26 and video decoder 36 may set the reference index for depth view RefPicList0 equal to −1. For the reference index for depth view RefPicList1, video encoder 26 and video decoder 36 may determine which one of the first and second 16×8 texture view macroblock encompasses the same area as the 8×8 depth view macroblock partition (assuming that the reference index for into texture view RefPicList1 for the first and second 16×8 texture view macroblock partitions is different). Video encoder 26 and video decoder 36 may set the reference index for the depth view RefPicList1 equal to reference index of the texture view RefPicList1 of the 16×8 texture view macroblock partition that encompasses the same area as the 8×8 depth view macroblock partition.

In this example, video encoder 26 and video decoder 36 may set the partition mode of the 8×8 depth view macroblock partition to "one 8×8 sub-block." Also, in this example, video encoder 26 and video decoder 36 may determine the motion vector information for the 8×8 depth view macroblock partition based on the motion vector information for the 16×8 texture view macroblock partition that encompasses the same area in the texture view macroblock that the 8×8 depth view macroblock partition encompasses the 16×16 depth view macroblock.

Although the previous example describes the condition where the 16×16 texture view macroblock is partitioned into two 16×8 texture view macroblock partitions, video encoder 26 and video decoder 36 may implement similar techniques in examples where the 16×16 texture view macroblock is partitioned into two 8×16 texture view macroblock partitions. Also, although the previous example describes the condition where the reference index for RefPicList0 is −1, video encoder 26 and video decoder 36 may implement similar techniques for conditions where the reference index for RefPicList1 −1.

In some examples, if one reference index is −1 and the other in the same reference picture list is not −1, video encoder 26 and video decoder 36 may set the reference index of the corresponding 8×8 depth view macroblock partition equal to the reference index of the texture view macroblock partition that is not equal to −1. For instance, keeping with the previous example, assume that the reference index for the texture view RefPicList0 for the first 16×8 texture view macroblock partition is "A," where A is not equal to −1, and the texture view RefPicList1 for the first 16×8 texture view macroblock partition is −1. Also, assume that the reference index for the texture view RefPicList0 for the second 16×8 texture view macroblock partition is "B," where B is not equal to −1, and the texture view RefPicList1 for the second 16×8 texture view macroblock partition is "C," where C is not equal to −1.

In this example, video encoder 26 and video decoder 36 may determine that the reference index for the depth view RefPicList1 for the 8×8 depth view macroblock partition is "C" because the reference index for texture view RefPicList1 for the first 16×8 texture view macroblock partition is −1, and the reference index for texture view RefPicList1 for the second 16×8 texture view macroblock partition is C. In other words, for depth view RefPicList1, video encoder 26 and video decoder 36 may set the reference index for the depth view macroblock partition to the reference index of the texture view macroblock partition that is not equal to −1.

As another example, assume that the reference index for the texture view RefPicList0 for the first 16×8 texture view macroblock partition is "D," where D is not equal to −1, and the texture view RefPicList1 for the first 16×8 texture view macroblock partition is −1. Also, assume that the reference index for the texture view RefPicList0 for the second 16×8 texture view macroblock partition is −1, and the texture view RefPicList1 for the second 16×8 texture view macroblock partition is "E," where E is not equal to −1.

In this example, video encoder 26 and video decoder 36 may determine that the reference index for depth view RefPicList0 for the 8×8 depth view macroblock partition is D because D is the reference index for RefPicList0 of the 16×8 texture view macroblock partition that is not equal to −1. Also, video encoder 26 and video decoder 36 may determine that the reference index for depth view RefPicList1 for the 8×8 depth view macroblock partition is E because E is the reference index for RefPicList1 of the 16×8 texture view macroblock partition that is not equal to −1.

In either of above examples where one of the reference indices is −1 and the other is not for each of the reference picture lists, video encoder 26 and video decoder 36 may determine the motion vector information for the 8×8 depth view macroblock partition based on the motion vector information for the texture view macroblock whose reference index is used as the reference index for the 8×8 depth view macroblock partition. For example, video encoder 26 and video decoder 36 may utilize the motion vector information of the 16×8 texture view macroblock partition whose reference index does not equal −1 (e.g., the second 16×8 texture view macroblock partition whose reference index into RefPicList1 is C, the first 16×8 texture view macroblock partition whose reference index into RefPicList0 is D, and the second 16×8 texture view macroblock partition whose reference index into RefPicList1 is E).

In the example where video encoder 26 and video decoder 36 determined that the reference index into the depth view RefPicList1 is C, video encoder 26 and video decoder 36 may still need to determine the reference index into depth view RefPicList0. In this case, if the reference index into the texture view RefPicList0 for the first 16×8 texture view macroblock partition does not equal the reference index into the texture view RefPicList1 for the second 16×8 texture view macroblock partition (e.g., A does not equal B in the above example), video encoder 26 and video decoder 36 may determine whether the 8×8 depth view macroblock partition encompasses the same area as the first 16×8 texture view macroblock partition or the second 16×8 texture view macroblock partition. Video encoder 26 and video decoder 36 may determine the reference index for depth view RefPicList0 to be A if the first 16×8 texture view macroblock encompasses the same area as the 8×8 depth view macroblock partition. Video encoder 26 and video decoder 36 may determine the reference index for depth view RefPicList0 to be B if the second 16×8 texture view macroblock encompasses the same area as the 8×8 depth view macroblock partition.

In this example, video encoder 26 and video decoder 36 may utilize the motion vector information for the 16×8 texture view macroblock that encompasses the same area as the 8×8 depth view macroblock partition to determine the motion vector information for the 8×8 depth view macroblock partition for the reference picture identified in RefPicList0. Also, in this example, video encoder 26 and video decoder 36 may set the partition mode for the 8×8 depth view macroblock partition to "one 8×8 sub-block."

In some of the preceding examples, the texture view macroblock was partitioned into two 8×16 or two 16×8 texture view macroblock partitions, where reference indices for the two 8×16 or two 16×8 texture view macroblock partitions were different and unequal to −1, were both −1, or one was −1 and the other was not −1. These preceding examples described example implementations for using motion information such as reference index, motion vector, and partition mode information for determining the motion information the corresponding 8×8 depth view macroblock partition.

The following example described example implementation where the reference indices for the two 8×16 or two 16×8 texture view macroblock partitions is the same and at least one of the reference indices is not −1. For instance, it in the above examples, it was assumed that reference index value of A for the first 16×8 texture view macroblock partition did not equal the reference index value of B for the second 16×8 texture view macroblock partition. However, in some cases A and B may be equal.

It should be understood that even in examples where the reference indices for the two 8×16 or two 16×8 texture view macroblock partitions is the same, video encoder 26 and video decoder 36 may implement techniques similar to those described above. The following techniques for where the reference indices for the two 8×16 or two 16×8 texture view macroblock partitions is the same and at least one of the reference indices is not −1 is provided as one example, and should not be considered limiting.

In this case, video encoder 26 and video decoder 36 may determine the reference index or indices for the 8×8 depth view macroblock partition is the same as the reference indices for either of the two 8×16 or two 16×8 texture view macroblock partitions because both reference indices are the same. Also, video encoder 26 and video decoder 36 may determine the sub-block partition for the 8×8 depth view macroblock partition is "two 8×4 sub-blocks" or "two 4×8 sub-blocks" based on whether the corresponding texture view macroblock is partitioned into two 16×8 texture view macroblock partitions or two 8×16 texture view macroblock partitions, respectively.

For the motion vector, video encoder 26 and video decoder 36 may utilize the motion vector for each of the corresponding motion vectors of the texture view macroblock partitions. For instance, if the 8×8 depth view macroblock partition is further partitioned into "two 8×4 sub-blocks" because the texture view macroblock is partitioned into two 16×8 texture view macroblock partitions, then video encoder 26 and video decoder 36 may determine the motion vector for the top 8×4 sub-block of the 8×8 depth view macroblock partition based on the motion vector for the top 16×8 texture view macroblock partition, and may determine the motion vector for the bottom 8×4 sub-block of the 8×8 depth view macroblock partition based on the motion vector for the bottom 16×8 texture view macroblock partition. Video encoder 26 and video decoder 36 may similarly determine the motion vectors for the 4×8 sub-blocks of the 8×8 depth view macroblock partition but based on the left and right 8×16 texture view macroblock partitions of the corresponding 16×16 texture view macroblock.

In some of the preceding examples, the texture view macroblock was partitioned into two 8×16 or two 16×8 texture view macroblock partitions, where reference indices in at least one of the reference picture lists for the two 8×16 or two 16×8 texture view macroblock partitions were the same and unequal to −1. In this manner, video encoder 26 and video decoder 36 may determine the sub-block partition for the 8×8 depth view macroblock partition is "two 8×4 sub-blocks" or "two 4×8 sub-blocks" based on whether the corresponding texture view macroblock is partitioned into two 16×8 texture view macroblock partitions or two 8×16 texture view macroblock partitions, respectively. Otherwise, (for each the reference picture list, if the reference indices for the two 16×8 or two 8×16 texture view partitions is different and unequal to −1, or both −1, or one was −1 and the other was not −1) the sub-block partition for the 8×8 depth view macroblock partition is set to "one 8×8 sub-block" (e.g., no further partitioning of the 8×8 depth view macroblock partition).

As described above, when IVMP is enabled (i.e., the examples described above where video encoder 26 and video decoder 36 use motion information from one of two 16×8 or two 8×16 texture view macroblock partitions for determining motion information for the 8×8 depth view macroblock partition), video encoder 26 and video decoder 36 may determine reference index or indices for the 8×8 depth view macroblock partition. When video encoder 26 and video decoder 36 determine the reference index or indices, the motion vectors of the relevant texture view macroblock partitions (i.e., one of the two 16×8 or two 8×16 texture view macroblock partitions), either having the same reference index or indices or having its reference index may be assigned to the corresponding 8×8 depth view macroblock partition.

Furthermore, for the motion vectors of the determined texture view macroblock partition that are used for the 8×8 depth view macroblock partition, video encoder 26 and video decoder 36 may perform scaling based on the spatial resolution of the depth view component and the texture view component. For instance, in the above examples, the spatial resolution of the depth view component is a quarter of the spatial resolution of the texture view component. Therefore, video encoder 26 and video decoder 36 may scale the motion vectors for the determined texture view macroblock partition to compensate for the difference in the spatial resolution. Video encoder 26 and video decoder 36 may also perform such scaling in examples where the mapping factor is applied, as described above.

For example, assume that video encoder 26 and video decoder 36 determine that the motion vector for the first one of the two 16×8 texture view macroblock partitions is to be used for determining the motion vector for the 8×8 depth view macroblock partition. Also, assume that the motion vector for this 16×8 texture view macroblock partition is represented as (MVx, MVy), where MVx is the x-component and MVy is the y-component of the motion vector. In this example, video encoder 26 and video decoder 36 may divide the MVx value by 2 and divide the MVy value by 2 to determine the motion vector for the 8×8 depth view macroblock partition. Video encoder 26 and video decoder 36 may divide each of the x and y components by 2 because the width of the depth view component is half the width of the texture view component, and the height of the depth view component is half the height of the texture view component. Accordingly, the motion vector for the 8×8 depth view macroblock partition, represented by MV', equals (MVx/2, MVy/2).

In the examples described above, if any of the 16×16 texture view macroblock partitions that correspond to a depth view macroblock are partitioned into four 8×8 texture view macroblock partitions, then IVMP is disabled for the depth view macroblock. However, this is not the case in every example. In some instances, even if a 16×16 texture view macroblock is partitioned into four 8×8 depth view macroblock partitions, IVMP may be enabled for the depth view macroblock.

In this example, video decoder 36 may determine the motion information (e.g., at least one of reference index information, partition mode information, and motion vector information) for the 8×8 depth view macroblock partition. For example, referring back to FIG. 4B, assume that texture view macroblock 6 corresponds to depth view partition 12B of depth view macroblock 10. In this example, even if texture view macroblock 6 is partitioned in four 8×8 texture view partitions 8A-8D, IVMP may not be disabled.

Instead, in this example, video decoder 36 determines which one of the 8×8 texture view partitions 8A-8D encompasses a same area relative to texture view macroblock 6 of where depth view partition 12B is located relative to depth view macroblock 10. For instance, texture view partition 8B encompasses a same area relative to texture view macroblock 6 of where depth view partition 12B is located relative to depth view macroblock 10. In this example, video decoder 36 may utilize the reference index of texture view partition 8B to determine the reference index of depth view partition 12B.

In the preceding examples, the spatial resolution of the depth view component was a quarter of the spatial resolution of the texture view component. However, the techniques described in this disclosure are not so limited. In other examples, the ratio between the spatial resolution of the depth view component and the texture view component may be different than a quarter. For purposes of illustration, the following describes example implementations of video encoder 26 and video decoder 36 when the spatial resolution of the depth view component is half the spatial resolution of the texture view component.

In examples where the spatial resolution of the depth view component is half the spatial resolution of the texture view component, the width of the depth view component may be half the width of the texture view component, and the heights may be the same, or the height of the depth view component may be half the height of the texture view component, and the widths may be same. Also, when the spatial resolution of the depth view component is half the spatial resolution of the texture view component, one depth view macroblock may correspond to two texture view macroblocks.

For example, in these cases, a 16×16 depth view macroblock may correspond to two 16×16 texture view macroblocks. The two corresponding 16×16 texture view macroblocks may be arranged side-by-side, or one on top of the other. If the texture view macroblocks are arranged side-by-side, then one of the two 16×8 depth view macroblock partitions corresponds to one of the two 16×16 texture view macroblocks, and the other of the two 16×8 depth view macroblock partitions correspond to other 16×16 texture view macroblock. If the texture view macroblocks are arranged one on top of the other, then each of the two 8×16 depth view macroblock partitions corresponds to each one of the two 16×16 texture view macroblocks, respectively.

Also, if the texture view macroblocks are arranged side-by-side, then one of the two 8×8 depth view macroblock sub-blocks corresponds to one of the two 16×8 texture view macroblock partitions, and the other of the two 8×8 depth view macroblock sub-block correspond to other 16×8 texture view macroblock partition. If the texture view macroblocks arranged one on top of the other, then each of the two 8×8 depth view macroblock sub-blocks corresponds to each one of the two 8×16 texture view macroblock partitions, respectively.

When the spatial resolution of the depth view component is half the spatial resolution of the texture view component, if any of the two corresponding macroblocks in the texture view component is intra-predicted, then video encoder 26 and video decoder 36 may determine that IVMP is disabled for the depth view macroblock. Also, if any of the two corresponding macroblocks in the texture view component has a macroblock partition mode equal to "four 8×8 MB partitions," then video encoder 26 and video decoder 36 may determine that IVMP is disabled for the depth view macroblock.

In some examples, if the width of the depth view component is half the width of the texture view component, and a macroblock partition for any of the two corresponding macroblocks in the texture view component is equal to "two 8×16 partitions," then video encoder 26 and video decoder 36 may determine that IVMP is disabled for the depth view macroblock. Similarly, if the height of the depth view component is half the height of the texture view component, and a macroblock partition for any of the two corresponding macroblocks in the texture view component is equal to "two 16×8 partitions," then video encoder 26 and video decoder 36 may determine that IVMP is disabled for the depth view macroblock.

If both corresponding macroblocks in the texture view component has a partition mode equal to "one 16×16 MB partition," video encoder 26 and video decoder 36 may determine (e.g., set) the partition for the depth view macroblock to be equal to "two 8×16 partitions" if the depth view component has half the width of the texture view component, or "two 16×8 partitions" if the depth view component has half the height of the texture view component. Otherwise, video encoder 26 and video decoder 36 may determine (e.g., set) the partition of the depth view macroblock to "four 8×8 MB partitions."

In examples where the spatial resolution of the depth view component is half the spatial resolution of the texture view component, if both of the corresponding texture view macroblocks has a partition mode equal to "one 16×16 MB partition," video encoder 26 and video decoder 36 may determine that the partition for depth view macroblock is equal to "two 8×16 MB partitions" if the depth view component has half the width of the texture view component, or "two 16×8 MB partitions" if the depth view component has half the height of the texture view component. In these examples, video encoder 26 and video decoder 36 may determine that the reference index for each of the depth view macroblock partitions is equal to the reference index of the texture view macroblock to which it corresponds. In some other examples, video encoder 26 and video decoder 36 may determine that the reference index for each of the 8×8 depth view macroblock sub-blocks is equal to the reference index of the 16×8 or 8×16 texture view macroblock partition to which it corresponds.

For determining the motion vector, in the examples where the spatial resolution of the depth view component is quarter of the texture view component, because the partition mode for each depth view macroblock partition of the depth view macroblock is determined from one texture view macroblock of the two corresponding texture view macroblocks, video encoder 26 and video decoder 36 may only scale one motion vector. For example, similar to the examples of the spatial resolution of the depth view component is quarter of the texture view component, video encoder 26 and video decoder 36 may need to scale the motion vector for the corresponding texture view macroblock to compensate of the difference in spatial resolutions.

For example, if the motion vector for the macroblock or partition of the texture view component is (MVx, MVy), and if the width of the depth view component is half the width of the texture view component, then video encoder 26 and video decoder 36 may determine the motion vector for the macroblock partition or sub-block of the depth view component, represented as MV', as being MV'=(MVx/2, MVy). If the height of the depth view component is half the height of the texture view component, then video encoder 26 and video decoder 36 may determine the motion vector for the macroblock partition or sub-block of the depth view component, represented as MV', as being MV'=(MVx, MVy/2).

Accordingly, in accordance with the techniques described in this disclosure, a video coder (e.g., video encoder 26 or video decoder 36) may encode or decode (e.g., code) a plurality of texture view blocks of a texture view component. The plurality of texture view blocks may correspond to a single depth view block of a depth view component. As an illustration, texture view macroblocks 2A-2D, in FIG. 4A, correspond to a single depth view macroblock 4.

Furthermore, the depth view component and the texture view component may belong to the same view within an access unit. In the examples described above, the depth view block (e.g., single depth view macroblock 4) may indicate relative depth of all pixels within the corresponding plurality of texture view blocks (e.g., texture view macroblocks 2A-2D). As described above, the spatial resolution of the texture view component and the depth view component may be different. For example, the spatial resolution of the depth view component may be quarter, which is half width and half height, of the texture view component, although other ratios are possible such as one-half.

The video coder may determine at least one of reference index information, partition information, and motion vector information of the single depth view block from a texture view block of the plurality of corresponding texture view blocks. In some examples, the video coder may determine at least one of reference index information, partition information, and motion vector information of the single depth view block only from the plurality of corresponding texture view blocks. The video coder may code the single depth view block based on the determined reference index information, partition information, and motion vector information.

For instance, at least one partition of the single depth view block corresponds to the texture view block of the corresponding texture view blocks. In accordance with the techniques described in this disclosure, to determine at least one of reference index information, partition information, and motion vector information of the single depth view block from a texture view block of the plurality of corresponding texture view blocks, the video coder may determine at least one of the reference index information, partition information, and motion vector information of the at least one partition of the single depth view block. In this example, the texture view block of the plurality of corresponding texture view blocks corresponds to the at least one partition of the depth view block.

For example, when inside view motion prediction (IVMP) is enabled for the single depth view block, the video coder may be configured to determine at least one of reference index information, partition information, and motion vector information of the single depth view block without signaling or receiving information as to how to determine the reference index information, partition information, and motion vector information of the single depth view block. Rather, the video coder may use the motion information for the plurality of texture view blocks to determine the motion information (e.g., the reference index information, partition information, and motion vector information) of the single depth view block.

As one example, the video coder may determine at least one of the reference index information, partition information, and motion vector information of the single depth view block for depth view macroblock 4 (FIG. 4A) based on one of texture view macroblocks 2A-2D (FIG. 4A). For example, as described above, to determine at least one of the reference index information, partition information, and motion vector information of the single depth view block, the video coder may determine at least one of the reference index information, partition information, and motion vector information of the single depth view block for a partition of the single depth view block. For instance, referring to FIG. 6, if the 8×8 depth view macroblock partition 42A of the 16×16 depth view macroblock 41 corresponds to the 16×16 texture macroblock 39, and IVMP is enabled for depth view macroblock 41, then video decoder 36 may utilize the reference index information and the motion vector information of texture view partition 40A or of texture view partition 40B to determine the reference index information and the motion vector information of depth view macroblock partition 42A.

The same would apply if any of depth view partitions 42B-42D corresponded to texture view macroblock 39. In this manner, when the video coder determines at least one of reference index information, partition information, and motion vector information of a partition of the depth view block from the texture view block that corresponds of the partition of the depth view block, the video coder may be considered as determining at least one of reference index information, partition information, and motion vector information of a partition of the depth view block from the texture view block of the plurality of corresponding texture view blocks.

There may be different example ways in which the video coder may determine where IVMP is enabled or disabled. For example, video encoder 26 may signal in the coded bitstream the IVMP flag as true or false to video decoder 36. In other examples, video decoder 36 may determine whether IVMP is enabled without needing to receive the IVMP flag. For example, video decoder 36 may determine that IVMP is disabled if any of the texture view blocks to which the single depth view block corresponds is intra-predicted or is partitioned into four 8×8 texture view macroblock blocks.

Furthermore, as described above, when the texture view block is partitioned into two 16×8 or 8×16 texture view block partitions, the video coder may determine which one of the two 16×8 or 8×16 texture view block partitions encompasses a same area relative to the texture view block of where the partition of the depth view block (e.g., the 8×8 depth view block partition) is located relative to the depth view block. The video coder may select the determined one of the two 16×8 or 8×16 texture view block partitions, and may determine the reference index for the partition of the depth view block based on the reference index of the selected one of the two 16×8 or 8×16 texture view block partitions. The video coder may similarly determine the reference index in examples where the texture view block that corresponds to the partition of the depth view block (e.g., the 8×8 depth view block partition) is partitioned into a plurality of texture view block partitions, such as four 8×8 texture view block partitions.

In examples where the texture view block that corresponds to the partition of the depth view block is partitioned as one 16×16 texture view block partition, the video coder may determine the reference index for the partition of the depth view block based on the reference index of the 16×16 texture view block partition. In this case, each of the 8×8 depth view partitions are set to one 8×8 depth view sub-block.

FIG. 7 is a block diagram illustrating an example of video encoder 26 that may implement techniques where the spatial resolutions of the texture view component and the depth view component are different. Video encoder 26 may perform intra- and inter-coding of blocks within video frames, including macroblocks, or partitions or sub-blocks (which are sub-partitions of the partitions) of macroblocks. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to any of several spatial based compression modes and inter-modes such as uni-directional prediction (P-mode) or bi-directional prediction (B-mode) may refer to any of several temporal-based compression modes.

The term frames and pictures may be used interchangeably. For example, the H.264 standard utilizes the term frame, and the HEVC stander utilizes the term picture.

Frame and picture refer to the same portion of video data, and are therefore synonymous.

As shown in FIG. 7, video encoder 26 receives a current video block within a video frame to be encoded. In the example of FIG. 7, video encoder 26 includes motion compensation unit 44, motion estimation unit 45, reference frame memory 64, summer 50, transform processing unit 52, quantization unit 54, and entropy coding unit 56. For video block reconstruction, video encoder 26 also includes inverse quantization unit 58, inverse transform unit 60, and summer 62. A deblocking filter (not shown in FIG. 7) may also be included to filter block boundaries to remove blockiness artifacts from reconstructed video. If desired, the deblocking filter would typically filter the output of summer 62. Other types of filters, such as loop filters or sample adaptive offset (SAO) filters may also be used.

During the encoding process, video encoder 26 receives a video frame or slice to be coded. The frame or slice may be divided into multiple video blocks. Motion estimation unit 45 and motion compensation unit 44 perform inter-predictive coding of the received video block relative to one or more blocks in one or more reference frames to provide temporal compression. Intra prediction unit 46 may perform intra-predictive coding of the received video block relative to one or more neighboring blocks in the same frame or slice as the block to be coded to provide spatial compression.

Mode select unit 43 may select one of the coding modes, intra or inter, e.g., based on error results, and provides the resulting intra- or inter-coded block to summer 50 to generate residual block data and to summer 62 to reconstruct the encoded block for use as a reference frame. In some examples, mode select unit 43 may also select inter-view prediction, e.g., for a full resolution picture.

In accordance with this disclosure, mode select unit 43 may be one example unit that performs the example functions described above. For example, mode select unit 43 may determine reference index information, partition information, and motion vector information for a single depth view block only from the motion information for the plurality of corresponding texture view blocks. However, aspects of this disclosure are not so limited. In other examples, a unit other than mode select unit 43 may implement the examples described above with respect to FIG. 5. In some other examples, mode select unit 43 in conjunction with one or more other units of video encoder 26 may implement the examples described above with respect to FIG. 5. In yet some other examples, a processor or unit of video encoder 26 (not shown in FIG. 7) may, alone or in conjunction with other units of video encoder 26, implement the examples described above with respect to FIG. 5.

Motion estimation unit 45 and motion compensation unit 44 may be highly integrated, but are illustrated separately for conceptual purposes. Motion estimation is the process of generating motion vectors, which estimate motion for video blocks. A motion vector, for example, may indicate the displacement of a predictive block within a predictive reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. A motion vector may also indicate displacement of a partition of a macroblock. Motion compensation may involve fetching or generating the predictive block based on the motion vector determined by motion estimation. Again, motion estimation unit 45 and motion compensation unit 44 may be functionally integrated, in some examples.

Motion estimation unit 45 calculates a motion vector for the video block of an inter-coded frame by comparing the video block to video blocks of a reference frame in reference frame memory 64. Motion compensation unit 44 may also interpolate sub-integer pixels of the reference frame, e.g., an I-frame or a P-frame. The ITU H.264 standard, as an example, describes two lists: list 0, which includes reference frames having a display order earlier than a current frame being encoded, and list 1, which includes reference frames having a display order later than the current frame being encoded. Therefore, data stored in reference frame memory 64 may be organized according to these lists. List 0 and list 1 may be considered as equivalent to the RefPicList0 and RefPicList1 described above with respect to FIG. 5.

Motion estimation unit 45 compares blocks of one or more reference frames from reference frame memory 64 to a block to be encoded of a current frame, e.g., a P-frame or a B-frame. When the reference frames in reference frame memory 64 include values for sub-integer pixels, a motion vector calculated by motion estimation unit 45 may refer to a sub-integer pixel location of a reference frame. Motion estimation unit 45 and/or motion compensation unit 44 may also be configured to calculate values for sub-integer pixel positions of reference frames stored in reference frame memory 64 if no values for sub-integer pixel positions are stored in reference frame memory 64. Motion estimation unit 45 sends the calculated motion vector to entropy coding unit 56 and motion compensation unit 44. The reference frame block identified by a motion vector may be referred to as a predictive block.

Motion compensation unit 44 may calculate prediction data based on the predictive block identified by a motion vector. Video encoder 26 forms a residual video block by subtracting the prediction data from motion compensation unit 44 from the original video block being coded. The residual block includes pixel-by-pixel differences between the predictive block and the original block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms, such as those defined by the H.264 standard or the HEVC standard, which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Quantization unit 54 quantizes the residual transform coefficients to further reduce bit rate. The quantization process may reduce the bit depth associated with some or all of the coefficients. The degree of quantization may be modified by adjusting a quantization parameter.

Following quantization, entropy coding unit 56 entropy codes the quantized transform coefficients. For example, entropy coding unit 56 may perform content adaptive variable length coding (CAVLC), context adaptive binary arithmetic coding (CABAC), or another entropy coding technique. Following the entropy coding by entropy coding unit 56, the encoded video may be transmitted to another device or archived for later transmission or retrieval. In the case of context adaptive binary arithmetic coding, context may be based on neighboring macroblocks.

In some cases, entropy coding unit 56 or another unit of video encoder 26 may be configured to perform other coding functions, in addition to entropy coding. For example, entropy coding unit 56 may be configured to determine the CBP values for the macroblocks and partitions. Also, in some cases, entropy coding unit 56 may perform run length coding of the coefficients in a macroblock or partition thereof. In particular, entropy coding unit 56 may apply a zig-zag scan or other scan pattern to scan the transform coefficients in a macroblock or partition and encode runs of zeros for further compression. Entropy coding unit 56 also may construct header information with appropriate syntax elements for transmission in the encoded video bitstream.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 45 and motion compensation unit 44 as a reference block to inter-code a block in a subsequent video frame.

Figure 8:
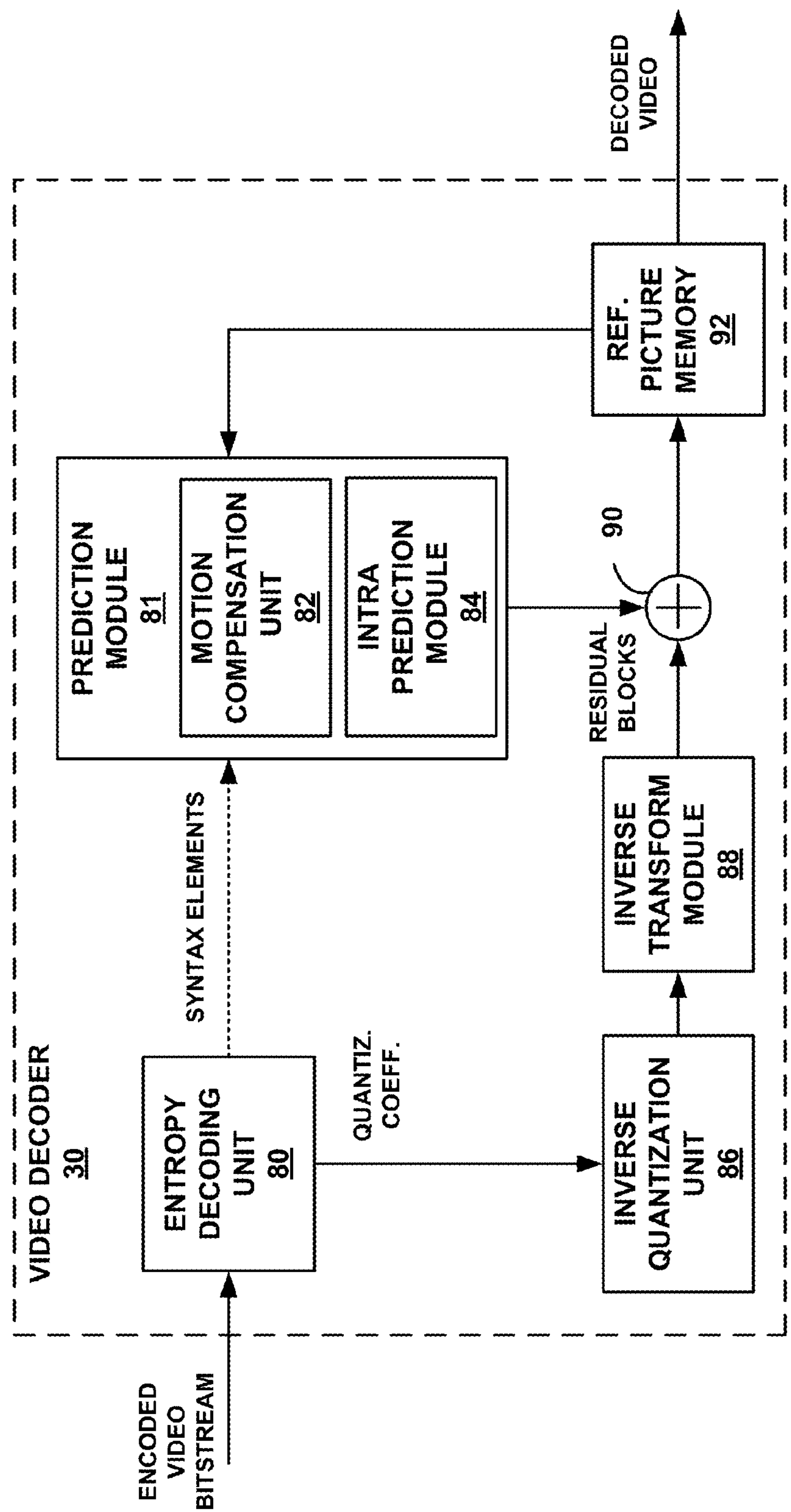
FIG. 8 is a block diagram illustrating an example of a video decoder that may implement techniques where the spatial resolutions of the texture view component and the depth view component are different.

FIG. 8 is a block diagram illustrating an example of video decoder 36 that may implement techniques where the spatial resolutions of the texture view component and the depth view component are different. In the example of FIG. 8, video decoder 36 includes an entropy decoding unit 70, motion compensation unit 72, intra prediction unit 74, inverse quantization unit 76, inverse transformation unit 78, reference frame memory 82 and summer 80. Video decoder 36 may, in some examples, perform a decoding pass generally reciprocal to the encoding pass described with respect to video encoder 26 (FIG. 7). Motion compensation unit 72 may generate prediction data based on motion vectors received from entropy decoding unit 70.

In accordance with this disclosure, motion compensation unit 72 may be one example unit that performs the example functions described above. For example, motion compensation unit 72 may determine reference index information, partition information, and motion vector information for a single depth view block only from the motion information for the plurality of corresponding texture view blocks. However, aspects of this disclosure are not so limited. In other examples, a unit other than motion compensation unit 72 may implement the examples described above with respect to FIG. 5. In some other examples, motion compensation unit 72 in conjunction with one or more other units of video decoder 36 may implement the examples described above with respect to FIG. 5. In yet some other examples, a processor or unit of video encoder 36 (not shown in FIG. 8) may, alone or in conjunction with other units of video decoder 36, implement the examples described above with respect to FIG. 5.

Motion compensation unit 72 may use motion vectors received in the bitstream to identify a prediction block in reference frames in reference frame memory 82. Intra prediction unit 74 may use intra prediction modes received in the bitstream to form a prediction block from spatially adjacent blocks. Inverse quantization unit 76 inverse quantizes, i.e., de-quantizes, the quantized block coefficients provided in the bitstream and decoded by entropy decoding unit 70. The inverse quantization process may include a conventional process, e.g., as defined by the H.264 decoding standard or the HEVC decoding standard. The inverse quantization process may also include use of a quantization parameter $QP_Y$ calculated by video encoder 26 for each macroblock to determine a degree of quantization and, likewise, a degree of inverse quantization that should be applied.

Inverse transform unit 58 applies an inverse transform, e.g., an inverse DCT, an inverse integer transform, or a conceptually similar inverse transform process, to the transform coefficients in order to produce residual blocks in the pixel domain. Motion compensation unit 72 produces motion compensated blocks, possibly performing interpolation based on interpolation filters. Identifiers for interpolation filters to be used for motion estimation with sub-pixel precision may be included in the syntax elements. Motion compensation unit 72 may use interpolation filters as used by video encoder 26 during encoding of the video block to calculate interpolated values for sub-integer pixels of a reference block. Motion compensation unit 72 may determine the interpolation filters used by video encoder 26 according to received syntax information and use the interpolation filters to produce predictive blocks.

Summer 80 sums the residual blocks with the corresponding prediction blocks generated by motion compensation unit 72 or intra-prediction unit to form decoded blocks. If desired, a deblocking filter may also be applied to filter the decoded blocks in order to remove blockiness artifacts. The decoded video blocks are then stored in reference frame memory 82, which provides reference blocks for subsequent motion compensation and also produces decoded video for presentation on a display device (such as display device 38 of FIG. 5).

Figure 9:
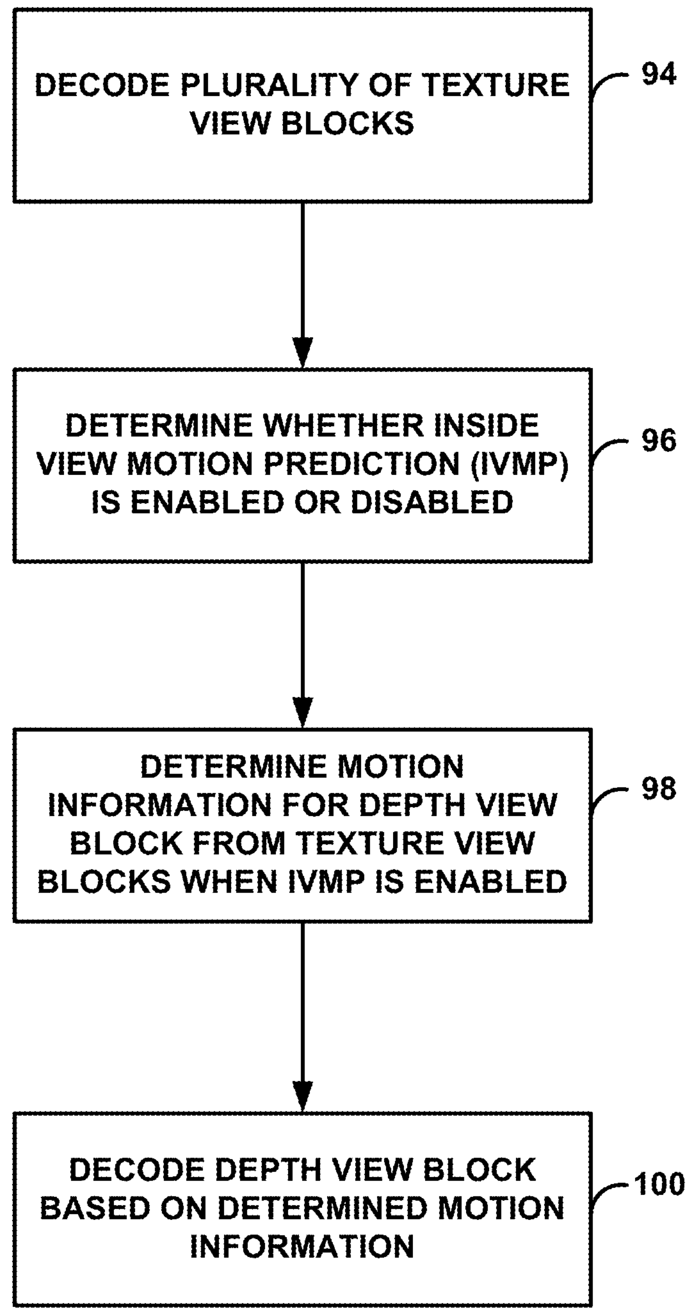
FIG. 9 is a flowchart illustrating an example operation of a video decoder in accordance with the techniques where the spatial resolutions of the texture view component and the depth view component are different.

FIG. 9 is a flowchart illustrating an example operation of a video decoder in accordance with the techniques where the spatial resolutions of the texture view component and the depth view component are different. For purposes of illustration, reference is made to FIGS. 5 and 8. For example, the techniques illustrated in FIG. 9 may be implemented by a video coder of a video device. Examples of the video device include destination device 20 (FIG. 5). Examples of the video coder include video decoder 36 (FIGS. 5 and 8). In some examples, where the video coder is video decoder 36, one or more of the example techniques described in this disclosure may be performed by prediction module 81 (FIG. 8). Moreover, although the techniques are described from the perspective of a video decoder, in some examples, a video encoder such as video encoder 26 may perform one or more of the techniques described in FIG. 9.

The video decoder may decode a plurality of texture view blocks of a texture view component, where the texture view blocks correspond to a single depth view block in a depth view component (94). The video decoder may determine whether inside view motion prediction (IVMP) is enabled or disabled for the depth view block (96). There may be various ways in which the video decoder may determine whether IVMP is enabled or disabled. As one example, the video decoder may decode an IVMP flag that indicates whether IVMP is enabled or disabled for the depth view block. As another example, the video decoder may be able to determine that IVMP is disabled for the depth view block without receiving the IVMP flag. For example, the video decoder may determine that one of the plurality of texture view blocks is intra-predicted or is partitioned into 8×8 partitions. In either of these cases, the video decoder may determine that IVMP is disabled for the depth view block without needing to receive the IVMP flag.

When IVMP is enabled, the video decoder may determine motion information for the depth view block based on the corresponding texture view blocks (98). The video decoder may decode the depth view block based on the determined motion information (100).

When IVMP is enabled, there may be various ways in which the video decoder may determine the motion information for the depth view block. For example, the video decoder may determine at least one of the reference index information, the partition mode information, and the motion vector information for each of the partitions of the depth view block. For instance, if the depth view block is partitioned into four 8×8 partitions, the video decoder may determine the reference index information, the partition mode information, and the motion vector information for each of the four 8×8 partitions.

As one example, each of the four 8×8 partitions of the depth view block may correspond to one texture view block of the plurality of texture view blocks. In this example, the video decoder may determine the motion information for each of the four 8×8 partitions based on the motion information for the corresponding texture view blocks. For instance, if the corresponding texture view block is partitioned as one 16×16 texture view macroblock, then the video decoder may set the reference index of 16×16 texture view macroblock as the reference index for the 8×8 depth view block partition that corresponds to this 16×16 texture view macroblock.

As another example, if the corresponding texture view block is partitioned into two texture view partitions (e.g., two 16×8 texture view macroblock partitions or two 8×16 texture view macroblock partitions), and a reference index for both of the two texture view partitions in the same reference picture list (e.g., texture view RefPicListX, where X is 0 or 1) is different and unequal to −1, the video decoder may select one of these two texture view partitions. The video decoder may set the reference index of the selected texture view partition as the reference index to the 8×8 depth view block partition that corresponds to the texture view block that is partitioned into the two texture view partitions. In some examples, the video decoder may select the texture view partition from the two texture view partitions that encompasses a same area in the texture view block that the 8×8 depth view block partition encompasses in the depth view block.

As another example, if the corresponding texture view block is partitioned into two texture view partitions (e.g., two 16×8 texture view macroblock partitions or two 8×16 texture view macroblock partitions), and a reference index for one is equal to −1, and the other in the same reference picture list is not equal to −1 (e.g., texture view RefPicListX, where X is 0 or 1), the video decoder may select the texture view partition whose reference index is not equal to −1. The video decoder may set the reference index of texture view block partition that is not equal to −1 as the reference index for the 8×8 depth view block partition that corresponds to the texture view block that is partitioned into the two texture view block partitions.

As yet another example, if the corresponding texture view block is partitioned into two texture view partitions (e.g., two 16×8 texture view macroblock partitions or two 8×16 texture view macroblock partitions), and a reference index for both in the same reference picture list X is equal to −1, the video decoder may disable the prediction of the 8×8 depth view block partition from the same reference picture list X. In other words, if the reference index into the texture view RefPicList0 for both of the two 16×8 or 8×16 texture view macroblock partitions is −1, then the video decoder may not inter-predict the 8×8 depth view macroblock partition from a reference depth view component in the depth view RefPicList0. For example, the video decoder may set the reference index into depth view RefPicList0 equal to −1.

The video decoder may also determine the motion vector and the partition mode of the 8×8 depth view block partitions. For example, the video decoder may scale one of the motion vectors for the texture view block that corresponds to the 8×8 depth view block partition. The video decoder may scale the motion vector based on the spatial resolutions of the texture view component and the depth view component. For example, if the spatial resolution of the depth view component is a quarter, which is half height and half width, of the spatial resolution of the texture view component, the video decoder may divide the x-component of the motion vector of the texture view block by two and divide the y-component of the motion vector of the texture view block by two to determine the scaled motion vector for the 8×8 depth view block partition.

For the partition mode, when IVMP is enabled, the video decoder may generally set the partition mode for the 8×8 depth view block partition to one 8×8 sub-block. However, if the 8×8 depth view block partition corresponds to a texture view block that is partitioned into two texture view block partitions, and a reference index for each of the two texture view block partitions is the same and unequal to −1, then the video decoder may set the partition for the 8×8 depth view block equal to two 8×4 sub-blocks or two 4×8 sub-blocks based on the manner in which the texture view block is partitioned. In general, if the partition mode for a depth view block partition is not two 8×4 sub-blocks, or two 4×8 sub-blocks, then the video decoder may set the partition mode for the depth view block a one 8×8 sub-block.

Figure 10:
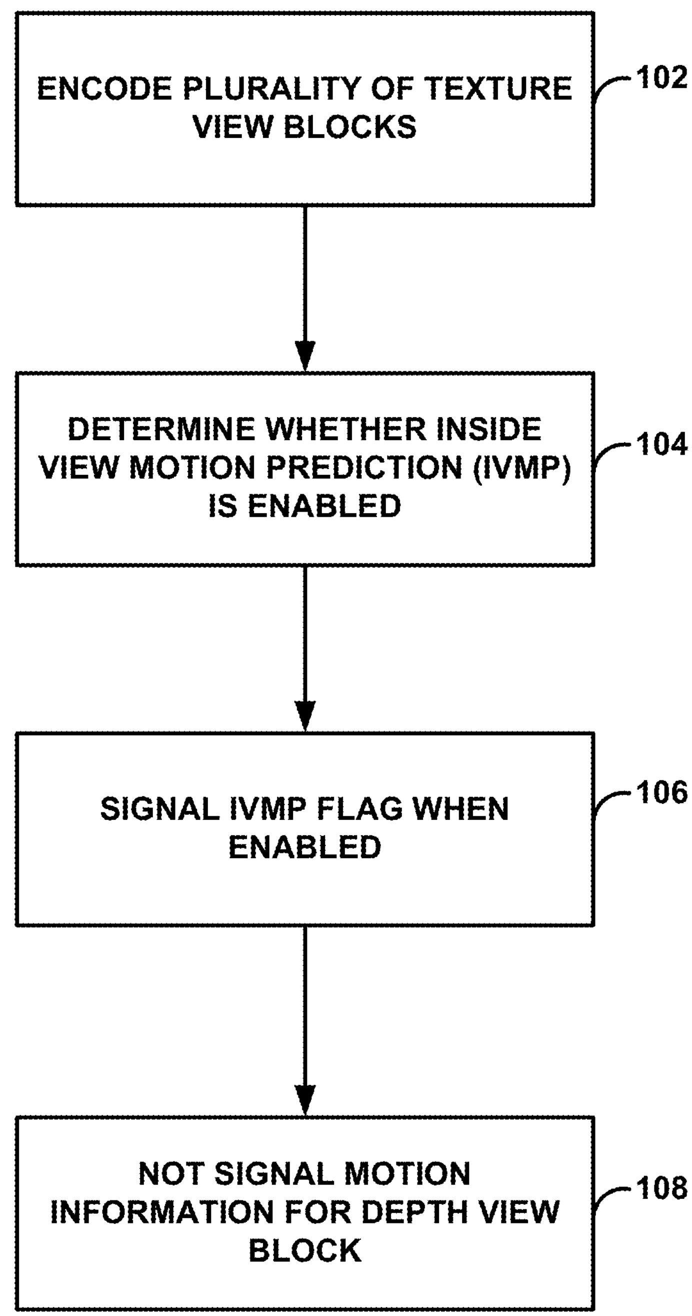
FIG. 10 is a flowchart illustrating an example operation of a video encoder in accordance with the techniques where the spatial resolutions of the texture view component and the depth view component are different.

FIG. 10 is a flowchart illustrating an example operation of a video encoder in accordance with the techniques where the spatial resolutions of the texture view component and the depth view component are different. For purposes of illustration, reference is made to FIGS. 5 and 7. For example, the techniques illustrated in FIG. 10 may be implemented by a video coder of a video device. Examples of the video device include source device 18 (FIG. 5). Examples of the video coder include video encoder 26 (FIGS. 5 and 7). In some examples, where the video coder is video encoder 26, one or more of the example technique described in this disclosure may be performed by mode select unit 43 (FIG. 7).

The video encoder may encode a plurality of texture view blocks of a texture view component (102). The video coder may also determine whether inside view motion prediction (IVMP) is enabled for a depth view block that corresponds to the plurality of texture view blocks (104). For example, if none of the plurality of texture view blocks is intra-predicted and if none of the plurality of texture view blocks is partitioned into 8×8 partitions, the video encoder may determine that IVMP is enabled for the single depth view block that corresponds to the plurality of texture view blocks.

When the video encoder determines that IVMP is enabled, the video encoder may signal the IVMP flag as true for the depth view block (106). The video decoder, upon receiving the IVMP flag as true, may then utilize the motion information for the plurality of texture view blocks for decoding the depth view block. For example, the video encoder may not need to signal the motion information for the depth view block (108). Rather, the video decoder may be configured to determine the motion information such as reference index information, partition mode information, and motion vector information for the depth view block based only on the texture view blocks.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for coding video data, the method comprising:

coding a plurality of texture view blocks of a texture view component, wherein the plurality of texture view blocks corresponds to a single depth view block of a depth view component, wherein a spatial resolution of the depth view component is a quarter of a spatial resolution of the texture view component, and wherein the spatial resolution of the depth view component is half width and half height relative to the texture view component;

based on a texture view block of the plurality of texture view blocks that corresponds to at least one partition of the single depth view block being partitioned into a plurality of texture view block partitions:

determining which one of the plurality of texture view block partitions of the texture block of the texture view component encompasses at least a same area relative to the texture view block as where the at least one partition of the single depth view block is located relative to the single depth view block in the depth view component having the quarter spatial resolution relative to the texture view component, wherein the determined one of the plurality of texture view block partitions encompasses at least the same area relative to the texture view block as where the at least one partition of the single depth view block is located relative to the single depth view block based on the determined one of the plurality of texture view block partitions and the at least one partition of the single depth view block including the same corner in respective ones of the texture block and the depth view block;

selecting the determined one of the plurality of texture view block partitions;

determining a reference index of the selected texture view block partition, the reference index of the selective texture view block partition identifying a reference texture view component having a picture order count (POC) value; and determining a reference index of the at least one partition of the single depth view block based on the reference index of the selected texture view block partition, the reference index of the at least one partition of the single depth view block identifies a POC value that is equal to the POC value of the identified reference texture view component; and coding the single depth view block based on the determined reference index of the at least one partition, wherein the depth view component and the texture view component belong to a same view within an access unit, and wherein the single depth view block indicates relative depth of all pixels within the corresponding plurality of texture view blocks.

2. The method of claim 1, further comprising:

determining that Inside View Motion Prediction (IVMP) is enabled for the single depth view block, wherein determining the reference index of the at least one partition comprises determining the reference index of the at least one partition based on IVMP being enabled.

3. The method claim 2, wherein determining that IVMP is enabled comprises determining that IVMP is enabled based on an IVMP flag indicating that IVMP is enabled.

4. The method of claim 1, wherein the single depth view block comprises a first depth view block and the plurality of texture view blocks comprises a first plurality of texture view blocks, the method further comprising:

determining that Inside View Motion Prediction (IVMP) is disabled for a second depth view block that corresponds to a second plurality of texture view blocks, based on at least one of a prediction mode of any of the second plurality of texture view blocks or a partition mode of any of the second plurality of texture view blocks.

5. The method of claim 4, wherein determining that IVMP is disabled comprises determining that IVMP is disabled based on any of the second plurality of texture view blocks being intra-predicted or based on any of the second plurality of texture view blocks being partitioned into four 8×8 texture view macroblock partitions.

6. The method of claim 1, further comprising:

determining a motion vector for the at least one partition of the single depth view block, and wherein determining the motion vector for the at least one partition of the single depth view block comprises:

scaling a motion vector for the texture view block of the plurality of texture view blocks that corresponds to the at least one partition; and setting the scaled motion vector as the motion vector for the at least one partition of the single depth view block.

7. The method of claim 1, wherein the texture view block that corresponds to the at least one partition of the single depth view block is partitioned as one 16×16 texture view block partition.

8. The method of claim 1, wherein determining which one of the plurality of texture view block partitions encompasses at least the same area, selecting the determined one of the plurality of texture view block partitions, and determining the reference index of the at least one partition comprise determining which one of the plurality of texture view block partitions encompasses at least the same area, selecting the determined one of the plurality of texture view block partitions, and determining the reference index of the at least one partition based on the texture view block that corresponds to the at least one partition of the single depth view block not being partitioned as two texture view block partitions and a reference index for both of the two texture view block partitions in one reference picture list not being equal to −1, the method further comprising:

based on the texture view block that corresponds to the at least one partition of the single depth view block being partitioned as two texture view block partitions and a reference index for both of the two texture view block partitions in one reference picture list being equal to −1, setting the reference index for the at least one partition of the single depth view block equal to −1.

9. The method of claim 1, wherein determining which one of the plurality of texture view block partitions encompasses at least the same area, selecting the determined one of the plurality of texture view block partitions, and determining the reference index of the at least one partition comprises determining which one of the plurality of texture view block partitions encompasses at least the same area, selecting the determined one of the plurality of texture view block partitions, and determining the reference index of the at least one partition based on the texture view block that corresponds to the at least one partition of the single depth view block not being partitioned as two texture view block partitions and a reference index for both of the two texture view block partitions in one reference picture list not being equal to −1, the method further comprising:

based on the texture view block that corresponds to the at least one partition of the single depth view block being partitioned as two texture view block partitions and a reference index for a reference picture list of a first partition of the two texture view block partitions being unequal to −1 and a reference index for the reference picture list of a second partition of the two texture view block partition is equal to −1, setting the reference index of the first partition of the two texture view block partition as the reference index for the at least one partition of the single depth view block.

10. The method of claim 1, further comprising:

determining a partition mode for the at least one partition of the single depth view block, wherein determining the partition mode for the at least one partition of the single depth view block comprises:

setting the partition mode of the at least one partition of the single depth view block as one 8×8 sub-block based on the texture view block that corresponds to the at least one partition of the single depth view block being partitioned into two texture view block partitions and a reference index of both of the texture view block partitions being different.

11. The method of claim 1, further comprising:

determining a partition mode for the at least one partition of the single depth view block, wherein determining the partition mode for the at least one partition of the single depth view block comprises:

setting the partition mode of the at least one partition of the single depth view block as one 8×4 sub-block or one 4×8 sub-block based on the texture view block that corresponds to the at least one partition of the single depth view block being partitioned into two texture view block partitions and a reference index of both of the texture view block partitions being the same.

12. The method of claim 1, wherein the texture view block that corresponds to the at least one partition of the single depth view block is partitioned into two 16×8 texture view block partitions or two 8×16 texture view block partitions.

13. The method of claim 1, wherein coding the plurality of texture view blocks comprises decoding the plurality of texture view blocks of the texture view component, wherein the plurality of texture view blocks corresponds to the single depth view block of the depth view component, and wherein coding the single depth view block comprises decoding the single depth view block based on the determined reference index of the at least one partition.

14. The method of claim 1, wherein coding the plurality of texture view blocks comprises encoding the plurality of texture view blocks of the texture view component, wherein the plurality of texture view blocks corresponds to the single depth view block of the depth view component, and wherein coding the single depth view block comprises encoding the single depth view block based on the determined reference index of the at least one partition.

15. A device for coding video data, the device comprising:

a memory unit configured to store a plurality reference pictures; and a video coder configured to:

code a plurality of texture view blocks of a texture view component, wherein the plurality of texture view blocks corresponds to a single depth view block of a depth view component, wherein a spatial resolution of the depth view component is a quarter of a spatial resolution of the texture view component, and wherein the spatial resolution of the depth view component is half width and half height relative to the texture view component;

based on a texture view block of the plurality of texture view blocks that corresponds to at least one partition of the single depth view block being partitioned into a plurality of texture view block partitions:

determine which one of the plurality of texture view block partitions of the texture block of the texture view component encompasses at least a same area relative to the texture view block as where the at least one partition of the single depth view block is located relative to the single depth view block in the depth view component having the quarter spatial resolution relative to the texture view component, wherein the determined one of the plurality of texture view block partitions encompasses at least the same area relative to the texture view block as where the at least one partition of the single depth view block is located relative to the single depth view block based on the determined one of the plurality of texture view block partitions and the at least one partition of the single depth view block including the same corner in respective ones of the texture block and the depth view block;

select the determined one of the plurality of texture view block partitions;

determine a reference index of the selected texture view block partition, the reference index of the selective texture view block partition identifying a reference texture view component having a picture order count (POC) value; and determine a reference index of the at least one partition of the single depth view block based on the reference index of the selected texture view block partition, the reference index of the at least one partition of the single depth view block identifies a POC value that is equal to the POC value of the identified reference texture view component; and code the single depth view block based on a reference picture of the plurality of reference pictures identified from the determined reference index of the at least one partition, wherein the depth view component and the texture view component belong to a same view within an access unit, and wherein the single depth view block indicates relative depth of all pixels within the corresponding plurality of texture view blocks.

16. The device of claim 15, wherein the video coder is configured to:

determine that Inside View Motion Prediction (IVMP) is enabled for the single depth view block, wherein the video coder is configured to determine the reference index of the at least one partition based on IVMP being enabled.

17. The device of claim 16, wherein the video coder is configured to code an IVMP flag to indicate that IVMP is enabled.

18. The device of claim 15, wherein the single depth view block comprises a first depth view block and the plurality of texture view blocks comprises a first plurality of texture view blocks, wherein the video coder is configured to determine that Inside View Motion Prediction (IVMP) is disabled for a second depth block that corresponds to a second plurality of texture view blocks, based on at least one of a prediction mode of any of the second plurality of texture view blocks or a partition mode of any of the second plurality of texture view blocks.

19. The device of claim 18, wherein the video coder is configured to determine that IVMP is disabled based on any of the second plurality of texture view blocks being intra-predicted or based on any of the second plurality of texture view blocks being partitioned into four 8×8 texture view macroblock partitions.

20. The device of claim 15, wherein the video coder is configured to determine a motion vector for the at least one partition of the single depth view block, and wherein, to determine the motion vector for the at least one partition of the single depth view block, the video coder is configured to:

scale a motion vector for the texture view block of the plurality of texture view blocks that corresponds to the at least one partition; and set the scaled motion vector as the motion vector for the at least one partition of the single depth view block.

21. The device of claim 15, wherein the texture view block that corresponds to the at least one partition of the single depth view block is partitioned as one 16×16 texture view block partition.

22. The device of claim 15, wherein the video coder is configured to determine which one of the plurality of texture view blocks partitions encompasses at least the same area, select the determined one of the plurality of texture view block partitions, and determine the reference index for the at least one partition of the single depth view block based on the texture view block that corresponds to the at least one partition of the single depth view block not being partitioned as two texture view block partitions and a reference index for both of the two texture view block partitions in one reference picture list not being equal to −1, wherein the video coder is configured to set the reference index for the at least one partition of the single depth view block equal to −1 based on the texture view block that corresponds to the at least one partition of the single depth view block being partitioned as two texture view block partitions and a reference index for both of the two texture view block partitions in one reference picture list being equal to −1.

23. The device of claim 15, wherein the video coder is configured to determine which one of the plurality of texture view blocks partitions encompasses at least the same area, select the determined one of the plurality of texture view block partitions, and determine the reference index for the at least one partition of the single depth view block based on the texture view block that corresponds to the at least one partition of the single depth view block not being partitioned as two texture view block partitions and a reference index for both of the two texture view block partitions in one reference picture list not being equal to −1, wherein the video coder is configured to set the reference index of the first partition of the two texture view block partition as the reference index for the at least one partition of the single depth view block based on the texture view block that corresponds to the at least one partition of the single depth view block being partitioned as two texture view block partitions and a reference index for a reference picture list of a first partition of the two texture view block partitions being unequal to −1 and a reference index for the reference picture list of a second partition of the two texture view block partition being equal to −1.

24. The device of claim 15, wherein the video coder is configured to determine a partition mode for the at least one partition of the single depth view block, and wherein, to determine the partition mode for the at least one partition of the single depth view block, the video coder is configured to:

set the partition mode of the at least one partition of the single depth view block as one 8×8 sub-block based on the texture view block that corresponds to the at least one partition of the single depth view block being partitioned into two texture view block partitions and a reference index of both of the texture view block partitions being different.

25. The device of claim 15, wherein the video coder is configured to determine a partition mode for at least one partition of the single depth view block, and wherein, to determine the partition mode for the at least one partition of the single depth view block, the video coder is configured to:

set the partition mode of the at least one partition of the single depth view block as one 8×4 sub-block or one 4×8 sub-block based on the texture view block that corresponds to the at least one partition of the single depth view block being partitioned into two texture view block partitions and a reference index of both of the texture view block partitions being the same.

26. The device of claim 15, wherein the texture view block that corresponds to the at least one partition of the single depth view block is partitioned into two 16×8 texture view block partitions or two 8×16 texture view block partitions.

27. The device of claim 15, wherein the video coder comprises a video decoder, and wherein the video decoder is configured to:

decode the plurality of texture view blocks of the texture view component, wherein the plurality of texture view blocks corresponds to the single depth view block of the depth view component; and decode the single depth view block based on the determined reference index of the at least one partition.

28. The device of claim 15, wherein the video coder comprises a video encoder, and wherein the video encoder is configured to:

encode the plurality of texture view blocks of the texture view component, wherein the plurality of texture view blocks corresponds to the single depth view block of the depth view component; and encode the single depth view block based on the determined reference index of the at least one partition.

29. The device of claim 15, wherein the device comprises one of:

a wireless communication device;

a microprocessor; or an integrated circuit.

30. A non-transitory computer-readable storage medium having stored thereon instructions that when executed, cause a processor of a device for coding video data to:

code a plurality of texture view blocks of a texture view component, wherein the plurality of texture view blocks corresponds to a single depth view block of a depth view component, wherein a spatial resolution of the depth view component is a quarter of a spatial resolution of the texture view component, and wherein the spatial resolution of the depth view component is half width and half height relative to the texture view component;

based on a texture view block of the plurality of texture view blocks that corresponds to at least one partition of the single depth view block being partitioned into a plurality of texture view block partitions:

determine which one of the plurality of texture view block partitions of the texture block of the texture view component encompasses at least a same area relative to the texture view block as where the at least one partition of the single depth view block is located relative to the single depth view block in the depth view component having the quarter spatial resolution relative to the texture view component, wherein the determined one of the plurality of texture view block partitions encompasses at least the same area relative to the texture view block as where the at least one partition of the single depth view block is located relative to the single depth view block based on the determined one of the plurality of texture view block partitions and the at least one partition of the single depth view block including the same corner in respective ones of the texture block and the depth view block;

select the determined one of the plurality of texture view block partitions;

determine a reference index of the selected texture view block partition, the reference index of the selective texture view block partition identifying a reference texture view component having a picture order count (POC) value;

determine a reference index of the at least one partition of the single depth view block based on the reference index of the selected texture view block partition, the reference index of the at least one partition of the single depth view block identifies a POC value that is equal to the POC value of the identified reference texture view component; and code the single depth view block based on the determined reference index of the at least one partition, wherein the depth view component and the texture view component belong to a same view within an access unit, and wherein the single depth view block indicates relative depth of all pixels within the corresponding plurality of texture view blocks.

31. A device for coding video data, the device comprising:

means for coding a plurality of texture view blocks of a texture view component, wherein the plurality of texture view blocks corresponds to a single depth view block of a depth view component, wherein a spatial resolution of the depth view component is a quarter of a spatial resolution of the texture view component, and wherein the spatial resolution of the depth view component is half width and half height relative to the texture view component;

means for determining which one of the plurality of texture view block partitions of a texture block of the texture view component encompasses at least a same area relative to the texture view block as where the at least one partition of the single depth view block is located relative to the single depth view block in the depth view component having the quarter spatial resolution relative to the texture view component based on the texture view block of the plurality of texture view blocks that corresponds to at least one partition of the single depth view block being partitioned into a plurality of texture view block partitions, wherein the determined one of the plurality of texture view block partitions encompasses at least the same area relative to the texture view block as where the at least one partition of the single depth view block is located relative to the single depth view block based on the determined one of the plurality of texture view block partitions and the at least one partition of the single depth view block including the same corner in respective ones of the texture block and the depth view block;

means for selecting the determined one of the plurality of texture view block partitions based on the texture view block of the plurality of texture view blocks that corresponds to the at least one partition of the single depth view block being partitioned into the plurality of texture view block partitions;

means for determining a reference index of the selected texture view block partition, the reference index of the selective texture view block partition identifying a reference texture view component having a picture order count (POC) value based on the texture view block of the plurality of texture view blocks that corresponds to the at least one partition of the single depth view block being partitioned into the plurality of texture view block partitions;

means for determining a reference index of the at least one partition of the single depth view block based on the reference index of the selected texture view block partition, the reference index of the at least one partition of the single depth view block identifies a POC value that is equal to the POC value of the identified reference texture view component, based on the texture view block of the plurality of texture view blocks that corresponds to the at least one partition of the single depth view block being partitioned into the plurality of texture view block partitions; and means for coding the single depth view block based on the determined reference index of the at least one partition, wherein the depth view component and the texture view component belong to a same view within an access unit, and wherein the single depth view block indicates relative depth of all pixels within the corresponding plurality of texture view blocks.

* * * * *